US009681708B2

(12) United States Patent
Greene et al.

(10) Patent No.: US 9,681,708 B2
(45) Date of Patent: *Jun. 20, 2017

(54) ARTICLE OF FOOTWEAR HAVING AN UPPER WITH A MATRIX LAYER

(71) Applicant: NIKE, INC., Beaverton, OR (US)

(72) Inventors: Pamela S. Greene, Portland, OR (US); John R. Hoke, III, Portland, OR (US); John Hurd, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 242 days.

This patent is subject to a terminal disclaimer.

(21) Appl. No.: 14/480,142

(22) Filed: Sep. 8, 2014

(65) Prior Publication Data

US 2014/0373288 A1    Dec. 25, 2014

Related U.S. Application Data

(60) Division of application No. 13/274,941, filed on Oct. 17, 2011, now Pat. No. 8,850,723, which is a
(Continued)

(51) Int. Cl.
*A43B 23/04* (2006.01)
*A43D 8/00* (2006.01)
(Continued)

(52) U.S. Cl.
CPC ............... *A43D 8/00* (2013.01); *A43B 7/085* (2013.01); *A43B 9/00* (2013.01); *A43B 13/04* (2013.01);
(Continued)

(58) Field of Classification Search
CPC ........... A43B 7/085; A43B 9/00; A43B 19/00; A43B 23/02; A43B 23/0215;
(Continued)

(56) References Cited

U.S. PATENT DOCUMENTS 1,227,981 A    5/1917 Tynes
1,877,080 A    9/1932 Teshima
(Continued)

FOREIGN PATENT DOCUMENTS

BE    531033 A    11/1957
DE    618718 C    9/1935
(Continued)

OTHER PUBLICATIONS

Nov. 16, 2006—(WO) Partial International Search Report—App. PCT/US2006/023953.
(Continued)

*Primary Examiner* — Ted Kavanaugh
(74) *Attorney, Agent, or Firm* — Banner & Witcoff, Ltd.

(57) ABSTRACT

Articles of footwear, including athletic footwear, include one or more of: (a) a sole structure; (b) an upper having lateral and medial side elements engaged with the sole structure, the upper made from a polymer matrix structure that extends through at least a heel region; (c) a size adjustment mechanism located at the heel region; (d) a heel tongue element located adjacent the size adjustment mechanism; (e) a shoe securing mechanism; (f) an instep tongue member; and/or (g) a bootie member located at least partially within the foot-receiving chamber. Methods of manufacturing such articles of footwear also are disclosed.

20 Claims, 33 Drawing Sheets

Related U.S. Application Data continuation of application No. 11/613,525, filed on Dec. 20, 2006, now Pat. No. 8,065,818, which is a continuation-in-part of application No. 11/340,409, filed on Jan. 26, 2006, now Pat. No. 7,540,097.

(60) Provisional application No. 60/692,336, filed on Jun. 20, 2005.

(51) Int. Cl.

| | | |
|---|---|---|
| *A43B 9/00* | (2006.01) | |
| *A43B 19/00* | (2006.01) | |
| *A43B 23/02* | (2006.01) | |
| *A43C 1/00* | (2006.01) | |
| *A43C 1/04* | (2006.01) | |
| *A43C 5/00* | (2006.01) | |
| *B29D 35/12* | (2010.01) | |
| *B29D 35/14* | (2010.01) | |
| *A43B 23/07* | (2006.01) | |
| *A43B 23/08* | (2006.01) | |
| *A43B 23/17* | (2006.01) | |
| *A43B 23/26* | (2006.01) | |
| *A43B 13/04* | (2006.01) | |
| *A43B 7/08* | (2006.01) | |

(52) U.S. Cl.
CPC .............. *A43B 19/00* (2013.01); *A43B 23/02* (2013.01); *A43B 23/0215* (2013.01); *A43B 23/0225* (2013.01); *A43B 23/0245* (2013.01); *A43B 23/0255* (2013.01); *A43B 23/0265* (2013.01); *A43B 23/0275* (2013.01); *A43B 23/0295* (2013.01); *A43B 23/04* (2013.01); *A43B 23/042* (2013.01); *A43B 23/07* (2013.01); *A43B 23/088* (2013.01); *A43B 23/17* (2013.01); *A43B 23/26* (2013.01); *A43C 1/00* (2013.01); *A43C 1/006* (2013.01); *A43C 1/04* (2013.01); *A43C 5/00* (2013.01); *B29D 35/126* (2013.01); *B29D 35/146* (2013.01)

(58) Field of Classification Search
CPC ............ A43B 23/0225; A43B 23/0245; A43B 23/0255; A43B 23/0275; A43B 23/0265; A43B 23/0295; A43B 23/04; A43B 23/042; A43B 23/07; A43B 23/088; A43B 23/26; A43C 1/00; A43C 1/006; A43C 1/04; A43C 5/00
USPC ............................................. 36/54, 105, 45
See application file for complete search history.

(56) References Cited

U.S. PATENT DOCUMENTS

| | | | |
|---|---|---|---|
| D90,369 S | 7/1933 | Kaminski |
| D91,999 S | 4/1934 | Helibrunn |
| 1,958,135 A | 5/1934 | Dunbar et al. |
| D95,204 S | 4/1935 | Haflin |
| 2,069,381 A | 2/1937 | Morgan |
| D103,592 S | 3/1937 | Perugia |
| D115,200 S | 6/1939 | Doree |
| 2,185,762 A | 1/1940 | Cox |
| 2,330,224 A | 9/1943 | L'Hollier |
| 2,420,239 A | 5/1947 | Hack |
| D160,838 S | 11/1950 | Brower |
| D164,847 S | 10/1951 | Dronoff |
| 2,596,188 A | 5/1952 | Webb |
| 2,954,617 A | 10/1960 | Yamaguchi |
| 3,228,122 A | 1/1966 | Ludwig |
| 3,426,454 A | 2/1969 | Mitchell et al. |
| 4,120,101 A | 10/1978 | Drew |
| 4,222,183 A | 9/1980 | Haddox |
| 4,265,032 A | 5/1981 | Levine |
| 4,447,967 A | 5/1984 | Zaino et al. |
| 4,458,373 A | 7/1984 | Maslow |
| D278,947 S | 5/1985 | Foldes |
| D293,964 S | 2/1988 | Baungratz |
| D293,966 S | 2/1988 | Baungratz |
| D293,968 S | 2/1988 | Baungratz |
| 4,813,158 A | 3/1989 | Brown |
| 4,858,339 A | 8/1989 | Hayafuchi et al. |
| D303,729 S | 10/1989 | Macasieb |
| 5,384,971 A | 1/1995 | Ferry |
| 5,449,005 A | 9/1995 | Echols |
| 5,647,150 A | 7/1997 | Romanato et al. |
| 5,765,296 A | 6/1998 | Ludemann et al. |
| D401,051 S | 11/1998 | Hamel |
| 6,401,364 B1 | 6/2002 | Burt |
| 6,665,954 B2 | 12/2003 | Chen |
| D498,583 S | 11/2004 | Yun |
| 7,065,820 B2 | 6/2006 | Meschter |
| 7,140,129 B2 | 11/2006 | Newson et al. |
| 7,774,884 B2 | 8/2010 | Greene et al. |
| 7,793,434 B2 | 9/2010 | Sokolowski et al. |
| 8,850,723 B2 * | 10/2014 | Greene .................... A43B 9/00 36/105 |
| 2002/0092205 A1 | 7/2002 | Hall et al. |
| 2002/0194749 A1 * | 12/2002 | Jones .................... A43B 1/0027 36/54 |
| 2005/0016023 A1 | 1/2005 | Burris et al. |
| 2005/0188562 A1 | 9/2005 | Clarke et al. |
| 2006/0048413 A1 | 3/2006 | Sokolowski et al. |
| 2007/0011910 A1 | 1/2007 | Keen |

FOREIGN PATENT DOCUMENTS

| | | |
|---|---|---|
| DE | 9213747 U1 | 12/1992 |
| FR | 2835405 A1 | 8/2003 |
| FR | 2853819 A1 | 10/2004 |
| JP | S52-81331 A | 7/1977 |
| JP | H06-38608 | 5/1994 |
| JP | H08-266305 A | 10/1996 |
| JP | 2005-270603 A | 10/2005 |
| JP | 2005-296327 A | 10/2005 |
| WO | 98/43506 A1 | 10/1998 |
| WO | 2006/028664 A1 | 3/2006 |
| WO | 2006-063019 A1 | 6/2006 |

OTHER PUBLICATIONS

Dec. 8, 2008—(WO) Preliminary Report on Patentability (ISR, WO)—App. PCT/US2007/088123.
Apr. 10, 2009—(CN) Office Action—App. 2006800263316.
Jul. 9, 2010—(EP) Office Action—App. 06785173.3.
Jan. 5, 2011—(JP) Office Action—App. 2008-517224.
Dec. 19, 2011—(JP) Office Action—App. 2008-517224.
Jan. 23, 2012—(EP) Office Action—App. 06785173.3.
Feb. 8, 2012—(JP) Office Action—App. 2009-543182.
Apr. 16, 2012—(JP) Office Action—App. 2009-229159.
Sep. 5, 2012—(JP) Office Action—App. 2009-543182.
Dec. 13, 2012—(JP) Office Action—App. 2009-229159.
Apr. 11, 2013—(JP) Office Action—App. 2009-543182.
Aug. 5, 2013—(JP) Office Action—App. 2012-095309.
Feb. 24, 2015—(EP) Extended Search Report—App. 14190173.6.

* cited by examiner

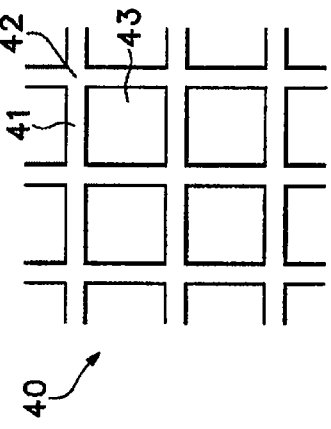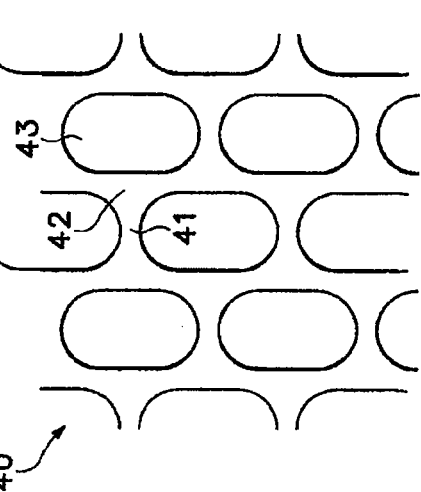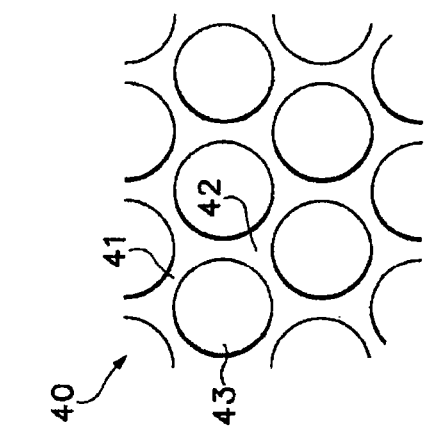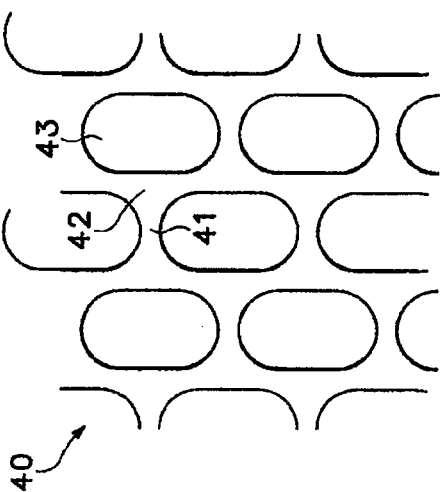

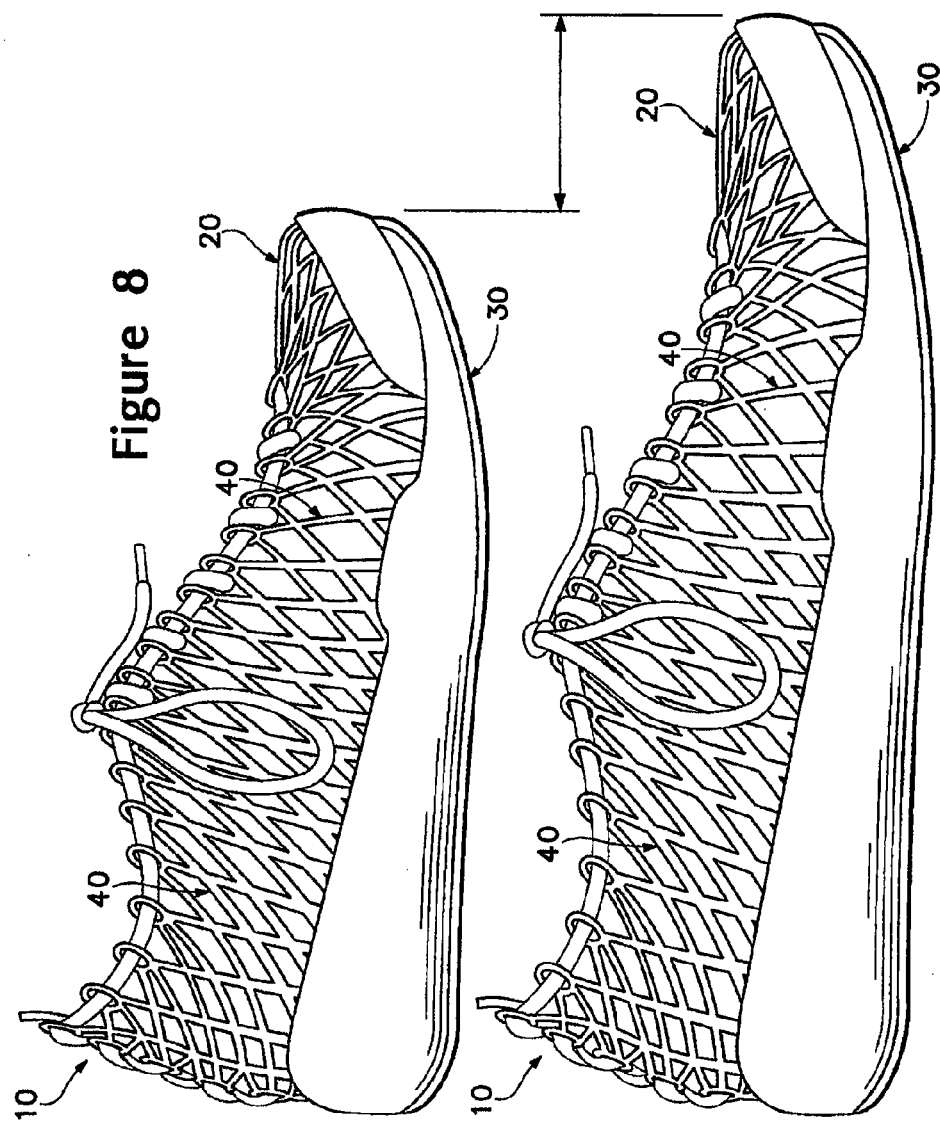

ARTICLE OF FOOTWEAR HAVING AN UPPER WITH A MATRIX LAYER

CROSS-REFERENCE TO RELATED APPLICATIONS

This U.S. patent application is a divisional application of and claims priority to co-pending U.S. patent application Ser. No. 13/274,941 filed on Oct. 17, 2011 and entitled "Article of Footwear Having An Upper With a Matrix Layer", which claims priority to U.S. patent application Ser. No. 11/613,525 filed on Dec. 20, 2006 and entitled "Article Of Footwear Having An Upper With A Matrix Layer" (now U.S. Pat. No. 8,065,818), which is a continuation-in-part application of U.S. patent application Ser. No. 11/340,409 filed on Jan. 26, 2006 and entitled "Article of Footwear Having An Upper With A Matrix Layer" (now U.S. Pat. No. 7,540,097 issued Jun. 2, 2009). These prior U.S. patent applications are entirely incorporated herein by reference. U.S. patent application Ser. No. 11/340,409, in turn, claims priority to U.S. Provisional Patent Application No. 60/692,336 filed on Jun. 20, 2005 and entitled "Article of Footwear Having An Upper With A Matrix Layer," this prior U.S. Provisional Patent Application being entirely incorporated herein by reference. This present application further claims priority to U.S. Provisional Patent Application No. 60/692,336.

BACKGROUND

Conventional articles of athletic footwear generally include two primary elements, an upper and a sole structure. The upper is secured to the sole structure and forms a void on the interior of the footwear for comfortably and securely receiving a foot. The sole structure is positioned between the upper and the ground, and it may include a polymer foam midsole and an outsole. The midsole attenuates ground (or other contact surface) reaction forces to lessen stresses upon the foot and leg. The outsole forms a ground-engaging portion (or other contact surface-engaging portion) of the sole structure and is formed from a durable and wear-resistant material. The sole structure also may include a sockliner or an insole member that is positioned within the void and proximal a lower surface of the foot to enhance footwear comfort.

The upper, in at least some footwear structures, generally extends over the instep and toe areas of the foot, along the medial and lateral sides of the foot, and around the heel area of the foot. In some articles of footwear, such as basketball footwear and boots, the upper may extend upward and around the ankle to provide support for the ankle Access to the void in the interior of the footwear is generally provided by an access opening. A lacing or other footwear securing system often is incorporated into the upper to selectively increase the size of the access opening and to permit the wearer to modify certain dimensions of the upper, particularly girth, to accommodate feet with varying dimensions and to allow for easy foot insertion and removal. In addition, the upper further may include a tongue that extends under the lacing system to enhance comfort of the footwear and a heel counter to limit movement of the heel.

Various materials are conventionally utilized in manufacturing uppers. The upper of athletic footwear, for example, may be formed from multiple material layers that include an exterior layer, an intermediate layer, and an interior layer. The materials forming the exterior layer of the upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials, however, may not exhibit the desired degree of flexibility and air-permeability for various other areas of the exterior layer of the upper. Accordingly, the other areas of the exterior layer may be formed from a synthetic textile, for example. The exterior layer of the upper may be formed, therefore, from numerous material elements that each imparts different properties to the upper. The intermediate layer of the upper is conventionally formed from a lightweight polymer foam material that provides impact force attenuation and enhances comfort. Similarly, the interior layer of the upper may be formed of a comfortable and moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

SUMMARY

One aspect of the invention relates to articles of footwear having an upper and a sole structure. The upper includes a matrix structure that defines a plurality of apertures. The apertures may have an elongate configuration to impart differences in the extensibility of the upper in different directions. As an example, the matrix layer may be formed from a plurality of segments that cross each other to define the apertures. The specific shapes of the apertures may vary to include quadrilaterals, hexagons, circles, ovals, triangles, and any other desired shape.

Additional aspects of this invention relate to articles of footwear, including athletic footwear or other types of footwear. Articles of footwear in accordance with at least some examples of this invention may include one or more of: (a) a sole structure; (b) an upper engaged with the sole structure, the upper having a lateral side element extending through at least a heel region of the footwear and a medial side element extending through at least the heel region of the footwear, wherein at least a portion of the lateral side element includes a polymer matrix and at least a portion of the medial side element includes a polymer matrix; (c) a size adjustment mechanism located at the heel region; (d) a heel tongue element located adjacent the size adjustment mechanism and the foot-receiving chamber; (e) a shoe securing mechanism engaged with at least one of the upper or the sole structure; (f) an instep tongue member engaged with at least one of the upper or the sole structure; and/or (g) a bootie member located at least partially within the foot-receiving chamber and optionally engaged with at least one of the upper, the sole structure, the heel tongue element, the instep tongue member, etc.

Further aspects of this invention relate to methods of manufacturing articles of footwear, e.g., of the various types described above. Such methods may include, for example: (a) forming one or more polymer matrix structures that defines a plurality of apertures, wherein the polymer matrix structure(s) provide a first free end and a second free end; (b) incorporating the polymer matrix structure(s) into an upper such that the first free end extends along a heel region of the upper and the second free end extends along the heel region of the upper; (c) engaging the first free end and the second free end; and (d) securing a sole member to the upper. The steps may take place in any desired order. The polymer matrix structure(s) may form any desired portion, portions, or proportions of the overall upper structure. One or more additional elements, structures, and/or features, such as a heel tongue element, a shoe securing mechanism, an instep tongue member, and/or a bootie element, may be incorporated into the overall footwear structure and/or footwear production method without departing from this invention.

The advantages and features of novelty characterizing various aspects of the invention are pointed out with particularity in the appended claims. To gain an improved understanding of the advantages and features of novelty, however, reference may be made to the following descriptive matter and the accompanying drawings that describe and illustrate various embodiments and concepts related to the aspects of the invention.

DESCRIPTION OF THE DRAWINGS

The foregoing Summary, as well as the following Detailed Description, will be better understood when read in conjunction with the accompanying drawings.

FIGS. 6A-6H depict various alternate configurations for the matrix layer.

FIG. 8 depicts lateral side elevational views of two articles of footwear having uppers with matrix layers in accordance with aspects of the invention.

DETAILED DESCRIPTION

Figure 1:
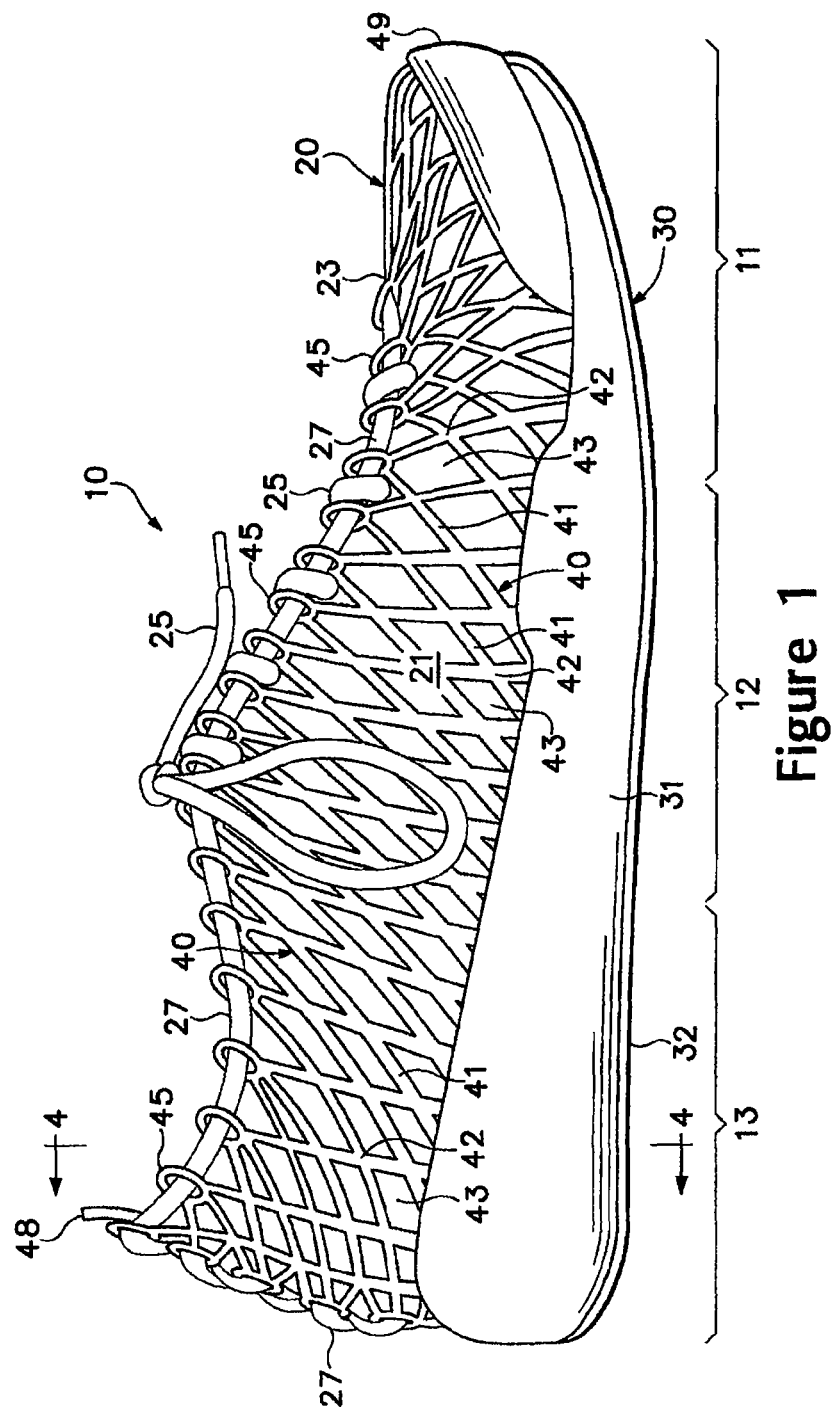
FIG. 1 is a lateral side elevational view of an example article of footwear having an upper with a matrix layer in accordance with aspects of the invention.

The following discussion and accompanying figures disclose various articles of footwear having uppers with polymer matrix layers in accordance with examples and aspects of the present invention. Concepts related to the polymer matrix layers are disclosed with reference to various articles of athletic footwear having configurations suitable, for example, for the sports of running and basketball. The polymer matrix layers, however, are not solely limited to footwear designed for running and basketball. Rather, they may be incorporated into a wide range of athletic footwear styles, including shoes that are suitable for baseball, cross-training, football, rugby, soccer, tennis, volleyball, and walking, for example. In addition, the polymer matrix layers may be incorporated into footwear that is generally considered to be non-athletic, including a variety of dress shoes, casual shoes, sandals, boots, shower shoes, beach/water shoes, shoes for water sports and/or for use in wet conditions, etc. An individual skilled in the relevant art will appreciate, therefore, that the concepts disclosed herein with regard to the polymer matrix layers may be applied to a wide variety of footwear styles, in addition to the specific styles discussed in the following material and depicted in the accompanying figures.

I. General Description of Aspects of This Invention

1. Articles of Footwear

Aspects of this invention relate to articles of footwear, including athletic footwear or other types of footwear, that include: (a) an upper having a lateral side element extending through at least a heel region of the footwear and a medial side element extending through at least the heel region of the footwear, wherein at least a portion of the lateral side element includes a polymer matrix and at least a portion of the medial side element includes a polymer matrix; (b) a size adjustment mechanism located at the heel region; (c) a heel tongue element located adjacent the size adjustment mechanism and the foot-receiving chamber; and (d) a sole structure engaged with the upper. Alternatively, if desired, the side elements of the upper may be permanently joined to one another in the heel region, e.g., by adhesives, cements, bonding, or other fusing techniques, and at least the size adjustment mechanism then can be omitted.

The size adjustment mechanism, when present, may take on a variety of forms without departing from this invention. For example, in some structures, the size adjustment mechanism may engage a free end of the lateral side element and/or a free end of the medial side element, e.g., such as in the form of a cord or lace that extends between the free ends of the lateral and medial side elements. In other examples, the size adjustment mechanism may include: (a) a first engagement element provided at a free end of the lateral side element, (b) a second engagement element provided at a free end of the medial side element, and (c) an intermediate member that engages and/or extends between the first and second engagement elements. As yet another example, if desired, the free ends of the medial and lateral side elements may directly engage one another, optionally in a stretchable or somewhat stretchable manner (i.e., the "intermediate member" mentioned above may be omitted, in at least some example structures according to this invention).

The heel tongue element may be provided in the overall footwear structure in any desired manner without departing from this invention. For example, if desired, the heel tongue element may be removably engaged with at least one of the upper and/or the sole structure (e.g., via one or more snaps or other mechanical fastener elements; via grooves, ledges, and/or other retaining member structures; etc.). Alternatively, if desired, at least some portion of it may be mounted into the overall footwear structure in a permanent manner (e.g., lasted into the footwear structure, for example, between the upper and the sole structure, between the outsole and midsole structures, etc.). The heel tongue element may be structured and positioned in the overall footwear structure so as to at least partially modulate user feel of any heel-located size adjustment mechanism.

Articles of footwear in accordance with at least some examples of this invention may include additional or alternative structures or features. For example, if desired, the upper portion of the article of footwear may define a throat area (e.g., extending at least partially along the instep area) wherein a shoe securing mechanism is engaged with the upper at the throat area. Any desired type of shoe securing mechanism, including shoe securing mechanisms that are conventional and known in the art (such as a lace securing mechanisms, buckles, straps, elastic members, zippers, or the like), may be used without departing from this invention. Additionally, if desired, a tongue member may be engaged with the upper adjacent the foot-receiving chamber and along the throat area, to at least partially modulate user feel of the shoe securing mechanism. If desired, the throat area oriented tongue member may be removably engaged with the upper member and/or the sole structure (e.g., to allow it to be removed, washed, repositioned, replaced with another, etc.).

As still another example, articles of footwear in accordance with examples of this invention further may include a bootie member at least partially in the foot-receiving chamber of the article of footwear. The bootie member may be engaged with the heel tongue element (optionally in a releasable or removable manner), the upper member, the sole structure, or other portion of the article of footwear. The bootie member can enhance comfort; provide resistance to cold, wet, or damp conditions; etc.

Optionally, if desired, a major portion of the upper may be made from a single polymer matrix, e.g., as a unitary, one piece construction. This unitary, one piece construction may form any desired portion of the overall upper structure, including, for example, both the lateral side element and the medial side element. In other example structures, however, the lateral side element and the medial side element may be produced from separate and independent polymer matrix pieces. In yet other examples, the polymer matrix structure will extend at least over a major portion of a forefoot portion of the upper structure. In still other example structures, the polymer matrix will be provided in the rear or heel portions of the footwear structure. Any desired location and/or combination of locations for the polymer matrix material in the overall polymer and/or upper structure may be provided without departing from this invention.

Apertures defined by the polymer matrix may extend in a variety of different directions, if desired, without departing from this invention. In some footwear structures, the apertures defined by the polymer matrix will extend generally radially from the throat area (e.g., the front or mid-instep area) toward a toe or extreme front area of the upper. In other example footwear structures, however, at least some of the apertures defined by the polymer matrix forward of the throat area will be elongated and extend in a transverse direction across the shoe in a direction from a lateral side of the upper toward a medial side of the upper (i.e., the long direction of the elongated apertures will extend generally in the medial-to-lateral side direction).

Still additional example footwear structures in accordance with at least some examples of this invention may include: (a) an upper that defines, at least in part, a foot-receiving chamber for the article of footwear, and wherein a major portion of a first element of the upper includes a polymer matrix, wherein the first element extends at least along a forefoot portion and a midfoot portion of the upper; (b) a shoe securing mechanism engaged with the upper, wherein the shoe securing mechanism includes at least one strap for engaging a wearer's heel or ankle that extends from a first side of the upper to a second side of the upper; and (c) a sole structure engaged with the upper. The strap may include a first fastener component that engages with a second fastener component provided with at least one of the upper or the sole structure. Such footwear structures also may include one or a combination of the various features described above (e.g., a throat area, an instep tongue, etc.).

2. Methods of Constructing Articles of Footwear

Further aspects of this invention relate to methods of manufacturing articles of footwear, e.g., of the various types described above. Such methods may include, for example: (a) forming a polymer matrix structure that defines a plurality of apertures, wherein the polymer matrix structure includes a first free end and a second free end; (b) incorporating the polymer matrix structure into an upper such that the first free end extends along a heel region of the upper and the second free end extends along the heel region of the upper; (c) engaging the first free end and the second free end, optionally in a releasable and/or adjustable manner; and (d) securing a sole member to the upper. These steps may be performed in any desired order and/or at any desired timing. The polymer matrix may form any desired portion, portions, or proportions of the overall upper structure.

The free ends of the polymer matrix structure may be engaged in any desired manner and/or using any desired structures without departing from this invention, including, for example: via a cord or lace, e.g., passing through eyelets or openings or engaging other structures provided at the free ends; via an intermediate connecting member that extends between and engages the free ends; by directly engaging one another at their free ends; etc. As additional alternatives, if desired, the free ends can be permanently engaged with one another, e.g., by adhesives, cements, fusing techniques, etc., to thereby form a lap joint or other seam at the heel region.

The footwear construction methods described above further may include steps for incorporating one or more additional structures into the overall footwear member. Such additional steps may include, but are not limited to: engaging a heel tongue element with at least one of the upper or the sole structure (e.g., at the heel region adjacent the first free end and the second free end); engaging a bootie member, e.g., with at least one of the heel tongue element, the upper member, and/or the sole structure, etc.; engaging an instep tongue member with at least one of the upper member or the sole structure, etc.; etc. If desired, the heel tongue, the instep tongue, and/or the bootie member may be engaged with the remainder of the footwear structure in a removable and releasable manner, e.g., to allow removal, interchange, and/or washing of these elements.

Another example of methods of manufacturing articles of footwear in accordance with examples of this invention includes: (a) forming a first polymer matrix structure that defines a plurality of apertures, wherein the first polymer matrix structure includes a first free end; (b) forming a second polymer matrix structure that defines a plurality of apertures, wherein the second polymer matrix structure includes a second free end; (c) incorporating the first and second polymer matrix structures into an upper such that the first free end extends along a heel region of the upper and the second free end extends along the heel region of the upper; (d) engaging the first free end and the second free end to one another, optionally in a releasable and/or adjustable manner; and (e) securing a sole member to the upper. These steps may occur in any desired order and/or at any desired timing. These methods also may include one or more of the additional steps, structures, and/or variations described above.

Still additional aspects of this invention relate to methods of manufacturing articles of footwear that include: (a) forming a polymer matrix structure that defines a plurality of apertures, wherein the polymer matrix structure extends as a unitary structure to form a major portion of at least a forefoot portion, a midfoot portion, and a heel portion of the article of footwear; (b) incorporating the polymer matrix structure into an upper; (c) securing a sole member to the upper; and (d) engaging a heel tongue element with at least one of the upper or the sole member. Again, these steps may take place in any desired order and/or at any desired timing. These methods also may include one or more of the additional steps, structures, and/or variations described above.

Additional examples of methods for manufacturing articles of footwear in accordance with at least some examples of this invention include: (a) forming a polymer matrix structure that defines a plurality of apertures, wherein the polymer matrix structure extends as a unitary structure to form a major portion of at least a forefoot portion and a midfoot portion of the article of footwear; (b) incorporating the polymer matrix structure into an upper; (c) providing a strap that extends from a first side of the upper to a second side of the upper to thereby provide a heel or ankle engaging system; and (d) securing a sole member to the upper. Again, these methods also may include one or more of the additional steps, structures, and/or variations described above, and the various steps may take place in any desired order and/or at any desired timing.

II. Detailed Description of Example Structures and Methods According to the Invention Specific examples of structures and methods according to the invention are described in more detail below. The reader should understand that these specific examples are set forth merely to illustrate examples of the invention, and they should not be construed as limiting the invention.

Figure 2:
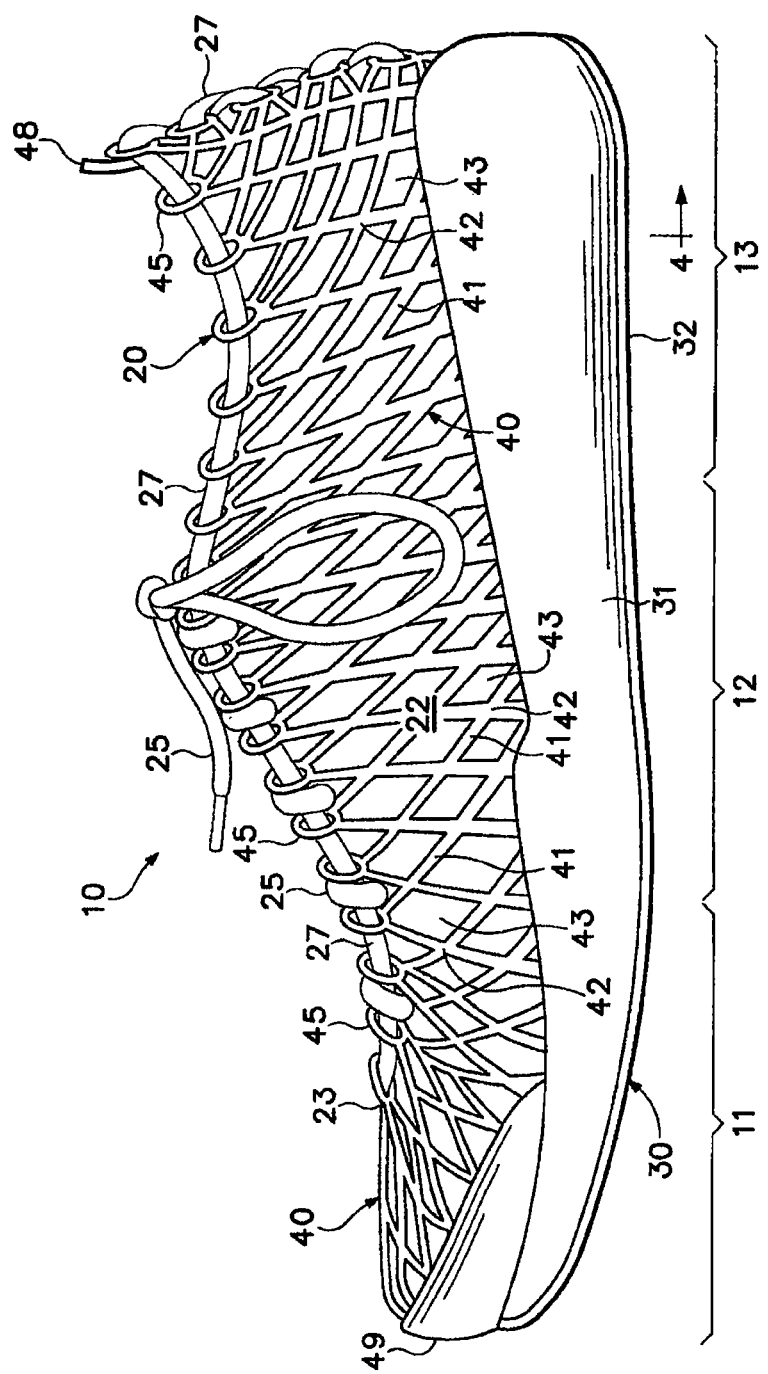
FIG. 2 is a medial side elevational view of this example article of footwear.

An article of footwear 10 is depicted in FIGS. 1-4 as including an upper 20 and a sole structure 30. For purposes of reference in the following description, footwear 10 may be divided into three general regions: a forefoot region 11, a midfoot region 12, and a heel region 13, as illustrated in FIGS. 1 and 2. Regions 11-13 are not intended to demarcate precise areas of footwear 10. Rather, regions 11-13 are intended to represent general areas of footwear 10 that provide a frame of reference during the following discussion. Although regions 11-13 apply generally to footwear 10, references to regions 11-13 also may apply specifically to upper 20, sole structure 30, or individual components within either upper 20 or sole structure 30.

Upper 20 is secured to sole structure 30 and defines a void or chamber for receiving a foot. For purposes of reference, upper 20 includes a lateral side 21, an opposite medial side 22, and a vamp or instep area 23. Lateral side 21 is positioned to extend along a lateral side of the foot (i.e., the outside) and generally passes through each of regions 11-13. Similarly, medial side 22 is positioned to extend along an opposite medial side of the foot (i.e., the inside) and generally passes through each of regions 11-13. Vamp area 23 is positioned between lateral side 21 and medial side 22 to correspond with an upper surface of the foot. Vamp area 23 includes a throat 24 having a lace 25 or other desired closure mechanism that is utilized in a conventional manner to modify the dimensions of upper 20 relative the foot, thereby adjusting the fit of footwear 10. Upper 20 also includes an ankle opening 26 that provides the foot with access to the void within upper 20.

Upper 20 also includes a heel element 48 and a toe element 49. Heel element 48 extends upward and along the interior surface of upper 20 to enhance the comfort of footwear 10. Toe element 49 is located in forefoot region 11 and on an exterior surface of upper 20 to provide wear-resistance, protect the wearer's toes, and assist with positioning of the foot. In some embodiments, one or both of heel element 48 and toe element 49 may be absent, or heel element 48 may be positioned on the exterior surface, for example. Additional examples and features of various heel elements (e.g., heel tongue elements) will be described in more detail below.

Sole structure 30 is secured to a lower surface of upper 20 and may have a generally conventional structure, e.g., that includes a midsole 31, an outsole 32, and a sockliner or insole member 33. Midsole 31 may be formed of polymer foam material, such as polyurethane, ethylvinylacetate, or other materials (such as phylon, phylite, etc.) that compress to attenuate ground or other contact surface reaction forces during walking, running, jumping, or other activities. In some example structures according to this invention, the polymer foam material may encapsulate or include various elements, such as a fluid-filled bladder or moderator, that enhance the comfort, motion-control qualities, stability, and/or ground or other contact surface reaction force attenuation properties of footwear 10. Outsole 32 is secured to a lower surface of midsole 31 and is formed of a wear-resistant material, such as rubber, that contacts the ground during ambulatory or other activities. The material forming outsole 32 may be manufactured of suitable materials and/or textured to impart enhanced traction and slip resistance. Sockliner 33 is a thin, compressible member that is located within the void in upper 20 and adjacent to a lower surface of the foot to enhance the comfort of footwear 10. Although the configuration of sole structure 30 discussed above is suitable for footwear 10, sole structure 30 may exhibit the configuration of any desired conventional or non-conventional sole structure without departing from this invention.

At least a portion of upper 20 includes a matrix layer 40 formed from a plurality of segments 41 that cross at various intersections 42. This configuration of segments 41 imparts the structure of a matrix and defines a plurality of apertures 43 in matrix layer 40. As utilized herein, the term "matrix" is intended to encompass a variety of configurations, including nets, grids, lattices, webs, and perforated materials, for example, that form apertures. Matrix layer 40 may be formed of unitary (i.e., one-piece) construction from polymer materials that include rubber, silicone, thermoplastic polyurethane, polypropylene, polyethylene, ethylvinylacetate, and styrene ethylbutylene styrene, for example. Although the hardness of the polymer material may vary significantly within the scope of various aspects of the invention, a polymer having a hardness of 98 or less on the Shore A scale enhances the comfort and flexibility of matrix layer 40, while continuing to provide support for the foot. In manufacturing matrix layer 40, the polymer material may be molded through an injection molding process, as described below, to impart the unitary construction. As an alternative, however, individual elements corresponding to segments 41 may be joined at intersections 42 to form a structure having the characteristics of matrix layer 40. For example, individual segments 41 may be bonded or adhered to each other so as to form matrix layer 40. As another example, if desired, matrix layer 40 may be laser cut or die cut to define segments 41, intersections 42, and apertures 43.

Matrix layer 40 provides a comfortable and compliant structure that extends adjacent to the foot. As described in greater detail below, matrix layer 40 stretches to accommodate foot movements and differences in foot dimensions. That is, the stretchability of matrix layer 40 ensures that footwear 10 may accommodate feet with a variety of proportions. Matrix layer 40 also provides a lightweight structure in upper 20, and apertures 43 impart a relatively high degree of air permeability to footwear 10. In some example matrix layer structures, the overall area of the upper defined by the matrix layer 40 will have a greater portion corresponding to the apertures 43 than the portion corresponding to the segments 41 and their intersections 42 (i.e., at least 50% of the surface area defined by the matrix layer upper (and even at least 60%, at least 75%, or at least 80% of the area) will have open space corresponding to the apertures 43). These advantages will be more apparent based upon the information presented in the following discussion.

Figure 5:
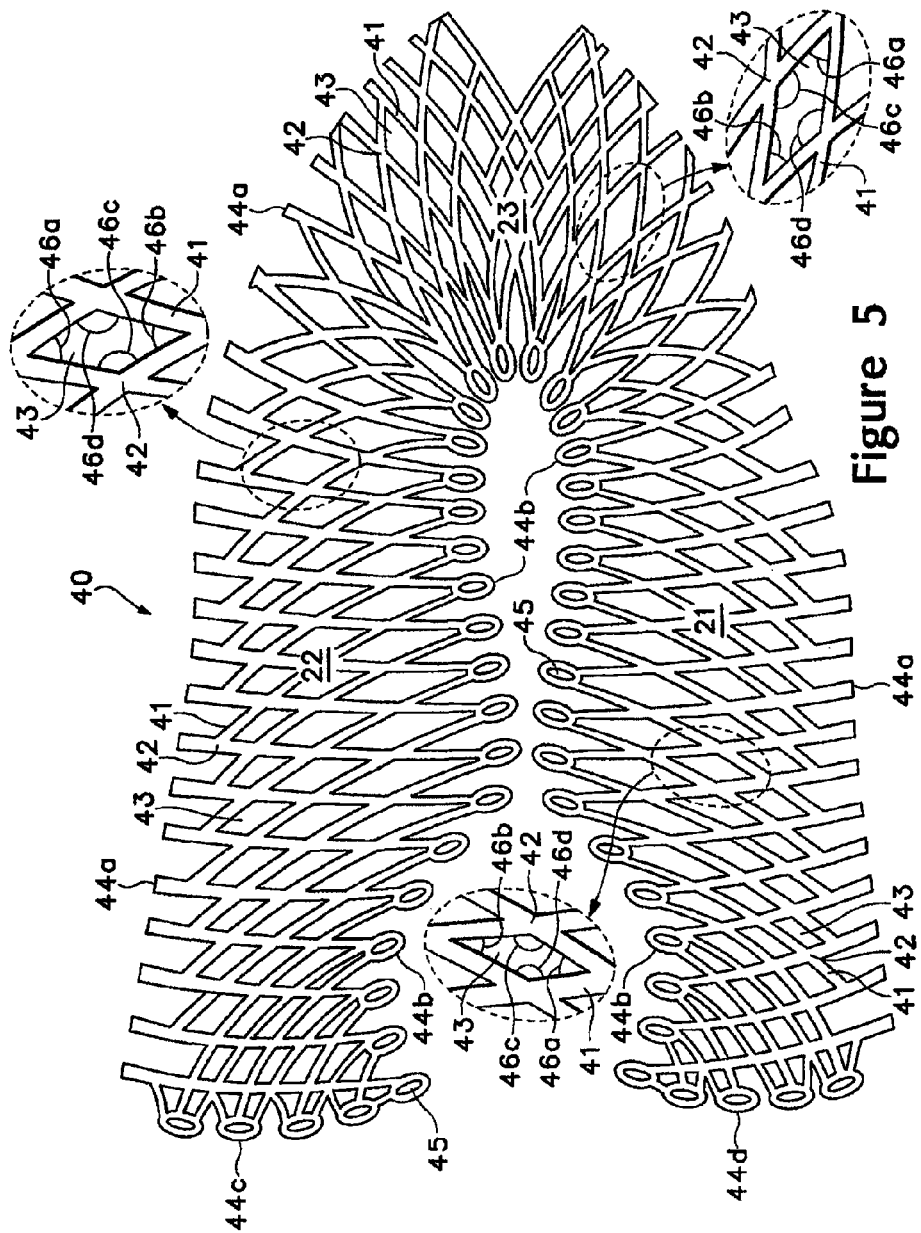
FIG. 5 is a top plan view of an example matrix layer for an article of footwear according to the invention.

Matrix layer 40 is depicted individually in FIG. 5 (before attachment to a sole member 30). For purposes of reference, numerals 21-23 are shown on FIG. 5 in order to demonstrate which areas of matrix layer 40 correspond with lateral side 21, medial side 22, and vamp area 23. In general, matrix layer 40 has a U-shaped configuration with a central area (vamp area 23) and a pair of side areas (lateral side 21 and medial side 22) extending from the central area. Terminal ends of the various segments 41 form a periphery of matrix layer 40 and define four edges 44a-44d. Edge 44a is an outermost edge of matrix layer 40, edge 44b is spaced inward from edge 44a, and edges 44c and 44d extend between edges 44a and 44b.

When matrix layer 40 is incorporated into footwear 10, edge 44a is positioned adjacent sole structure 30 and may be joined with sole structure 30. The portion of edge 44b that is positioned adjacent to the central area defines throat 24, and the portion of edge 44b that is positioned adjacent edges 44c and 44d defines ankle opening 26. Edges 44c and 44d are joined to each other in heel region 13 and extend generally vertically between sole structure 30 and ankle opening 26. As noted above, terminal ends of the various segments 41 define edges 44a-44d. Along each of edges 44b-44d, at least some of the terminal ends of segments 41 form a plurality of loops 45, e.g., with a circular shape, elliptical shape, or any other practical or desired shape. As depicted in FIGS. 1-4, in this illustrated example, a cord 27 extends through loops 45 and is utilized to join edges 44c and 44d to each other at the rear portion of footwear structure 10. When cord 27 extends through loops 45, loops 45 may rotate or otherwise move to accommodate cord 27. Forming loops 45 at ends areas of segments 41 facilitates this movement of loops 45.

Segments 41 intersect or otherwise cross each other at intersections 42. The orientations and overall positions of segments 41 have an effect upon the shape of apertures 43. As depicted in each of FIGS. 1-5, many apertures 43 in this example structure are formed to exhibit an elongate and generally quadrilateral-shaped configuration (e.g., a diamond-shaped configuration). More particularly, a majority of segments 41 are oriented to generally extend between edges 44a and 44b, and this orientation forms many apertures 43 that are generally longer in a direction that is perpendicular to edges 44a and 44b than in a direction that is parallel to edges 44a and 44b.

The orientation of segments 41 and the resulting shape of apertures 43 have an effect upon the directional extensibility (i.e., stretchability) of matrix layer 40. As discussed above, many apertures 43 have an elongate and quadrilateral-shaped configuration, and many apertures 43 are longer in the direction generally perpendicular to edges 44a and 44b than in the direction generally parallel to edges 44a and 44b. In this configuration, matrix layer 40 generally has greater extensibility in the direction generally parallel to edges 44a and 44b, and matrix layer 40 generally has lesser extensibility in the direction generally perpendicular to edges 44a and 44b. Accordingly, the degree to which matrix layer 40 stretches depends upon the direction in which matrix layer 40 is stretched.

The directional differences in extensibility in this example matrix layer structure 40 are due, in part, to relative angles that form the elongate and quadrilateral-shaped configuration of apertures 43. With reference to FIG. 5, various apertures 43 are referenced as having four angles 46a-46d. Each angle 46a is oriented such that a vertex of angle 46a points toward edge 44a. Each angle 46b is positioned opposite an angle 46a and is oriented such that a vertex of angle 46b points toward edge 44b. Similarly, angles 46c and 46d are positioned opposite each other and vertices of angles 46c and 46d point respectively toward the front and back of the upper matrix structure 40, respectively. In other words, the vertices of angles 46a and 46b point in the direction that is generally perpendicular to edges 44a and 44b, and the vertices of angles 46c and 46d point in the direction that is generally parallel to edges 44a and 44b. As an additional point, intersections 42 generally also form angles 46a-46d.

Whereas angles 46a and 46b in this illustrated example structure 40 generally are acute angles, angles 46c and 46d are obtuse angles, at least when matrix layer 40 is in an unstretched, uncompressed, or otherwise undeformed state. In terms of radians, each of angles 46a and 46b have a value of less than $0.50\pi$ radians, and each of angles 46c and 46d have a value of greater than $0.50\pi$ radians. As a more specific example, in at least some example structures 40, angles 46a and 46b may have a radian measurement of $0.25\pi$ radians or less (i.e., 45 degrees), but these angles may range from $0.01\pi$ to $0.49\pi$ radians, for example. Correspondingly, angles 46c and 46d may have a radian measurement of $0.75\pi$ radians or more (i.e., 135 degrees), but these angles may range from $0.51\pi$ to $0.99\pi$ radians, for example. When matrix layer 40 is stretched, the relative radian measurement of each of angles 46a-46d may change somewhat, e.g., based upon the direction in which matrix layer 40 is stretched.

When matrix layer 40 is stretched in the direction that is generally perpendicular to edges 44a and 44b, the radian measurement of angles 46a and 46b decreases and the radian measurement of angles 46c and 46d increases. More particularly, the radian measurement of angles 46a and 46b will change toward and approach zero upon the application of a tensile force in the direction that is generally perpendicular to edges 44a and 44b. If further tensile force is applied, segments 41 will stretch in length to resist the tensile force. Given that angles 46a and 46b are acute angles, the radian measurement of angles 46a and 46b need only change to a relatively small degree in order to reduce the radian measurement to zero or near zero.

Conversely, when matrix layer 40 is stretched in the direction that is generally parallel to edges 44a and 44b, the radian measurement of angles 46c and 46d decreases and the radian measurement of angles 46a and 46b increases. More particularly, the radian measurement of angles 46c and 46d will change toward and approach zero upon the application of sufficient tensile force in the direction that is generally parallel to edges 44a and 44b. If further tensile force is applied, segments 41 will stretch in length to resist the tensile force. Given that angles 46c and 46d are obtuse angles, the radian measurement of angles 46a and 46b must change a relatively large degree in order to reduce the radian measurement to zero or near zero.

As described above, changes in the radian measurements of angles 46a-46d occur upon the application of tensile forces. Differences in the radian measurements of angles 46a and 46b and the radian measurements of angles 46c and 46d have an effect upon the extensibility of matrix layer 40 in specific directions. That is, the acute nature of angles 46a and 46b permits a relatively small degree of extensibility in the direction that is generally perpendicular to edges 44a and 44b. The obtuse nature of angles 46c and 46d, however, permit a relatively large degree of extensibility in the direction that is generally parallel to edges 44a and 44b. Accordingly, matrix layer 40 is configured to have greater extensibility in the direction that is parallel to edges 44a and 44b.

When incorporated into footwear 10, the differences in directional extensibility have an effect upon the overall fit and adjustability of footwear 10. The tightening of lace 25 effectively induces a tensile force in the direction that is generally perpendicular to edges 44a and 44b, at least in the area of throat 24. Given the relatively low degree of stretch in this direction, the wearer is capable of tightening upper 20 to a degree that comfortably, but securely, holds the foot positioned with respect to sole structure 30. In areas that are adjacent to throat 24, matrix layer 40 still has the capacity, however, to stretch in the direction that is generally parallel to edges 44a and 44b. During ambulatory activities, therefore, matrix layer 40 will stretch in the direction that is generally parallel to edges 44a and 44b in order to accommodate flexing or other movements of the foot.

Matrix layer 40 also provides comfort in forefoot region 11. Note that in forefoot region 11, the direction that is generally perpendicular to edges 44a and 44b extends in a longitudinal direction of footwear 10. Matrix layer 40 stretches, therefore, a relatively small degree in the longitudinal direction in forefoot region 11. In the direction that is generally parallel to edges 44a and 44b in forefoot region 11, matrix layer 40 stretches to a larger degree. Accordingly, matrix layer 40 stretches to accommodate movements or changes in the dimensions of the forefoot, which includes the toes and ball of the foot. When, for example, the foot rolls forward such that the heel leaves the ground and the metacarpo-phalangeal joints are flexed, the foot may expand slightly in the medial to lateral direction at the metacarpo-phalangeal joints. Given that matrix layer 40 stretches in the medial to lateral direction, these movements of the foot are unrestricted, which provides a comfortable feel for the wearer.

The degree to which matrix layer 40 stretches upon the application of a tensile force is at least partially dependent upon the shape of apertures 43, as discussed above. Other factors, including the materials that form matrix layer 40, the thickness of segments 41, the size of the apertures 43, etc., also will have an effect upon the degree to which matrix layer 40 stretches. For many of the polymer materials listed above, a suitable ratio of the area of apertures 43 to the area of segments 41 may be at least 1.5:1, and in some examples, at least 2:1, 3:1, or even higher.

Figure 6F:
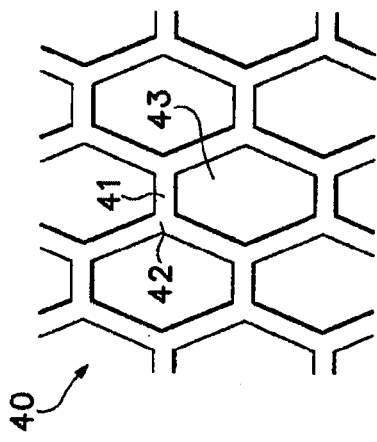
Figure 6H:
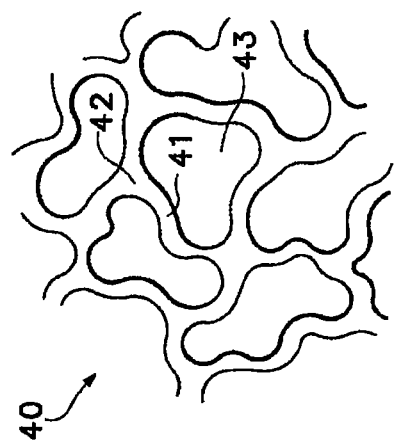
Figure 6E:
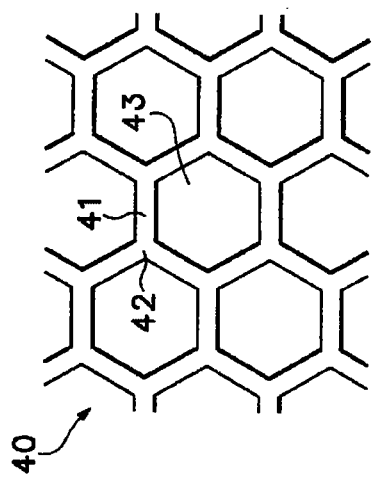
Figure 6G:
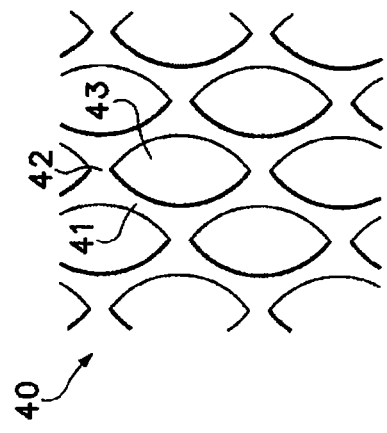

As discussed above, several of the apertures 43 of this example matrix layer structure 40 have an elongate and generally quadrilateral-shaped configuration, and these apertures 43 generally are arranged longer in the direction that is generally perpendicular to edges 44a and 44b than in the direction that is generally parallel to edges 44a and 44b. In some articles of footwear, however, forming apertures 43 with other configurations may be beneficial. With reference to FIG. 6A, a portion of an alternate configuration of matrix layer 40 is depicted, wherein apertures 43 are longer in the direction that is generally parallel to edges 44a and 44b than in the direction that is generally perpendicular to edges 44a and 44b. FIG. 6B depicts another configuration, wherein apertures 43 have a square or otherwise non-elongate shape. With reference to FIG. 6C, apertures 43 are depicted as having a round shape. Apertures 43 may also exhibit an oval or elliptical shape, as depicted in FIG. 6D. In some example embodiments, apertures 43 may be formed to have a hexagonal shape, as depicted in FIG. 6E, and optionally an elongated hexagonal shape as shown in FIG. 6F. Furthermore, apertures 43 may have random or arbitrary shapes, e.g., similar to shapes depicted in FIGS. 6G and 6H. Accordingly, the shapes of apertures 43 may vary significantly. A single matrix layer structure 40 may have apertures 43 of multiple different sizes and/or shapes, if desired.

Figure 3:
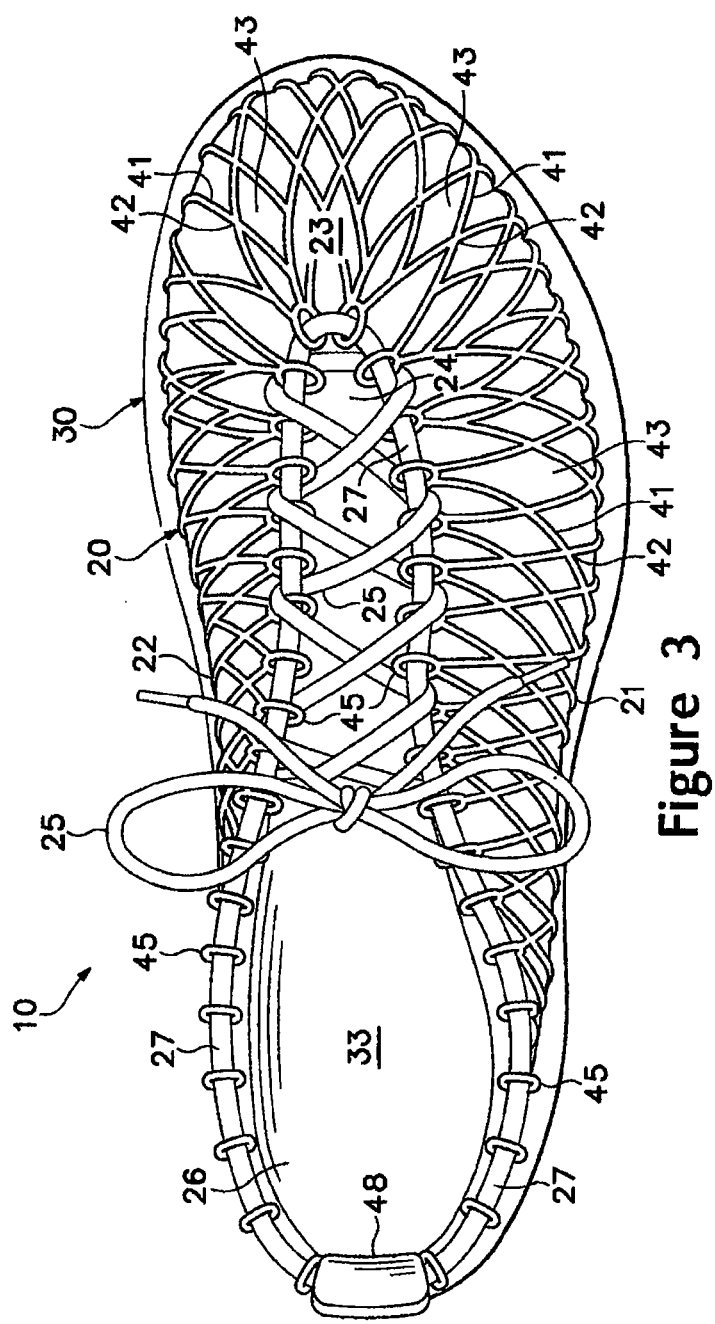
FIG. 3 is a top plan view of the article of footwear.
Figure 4:
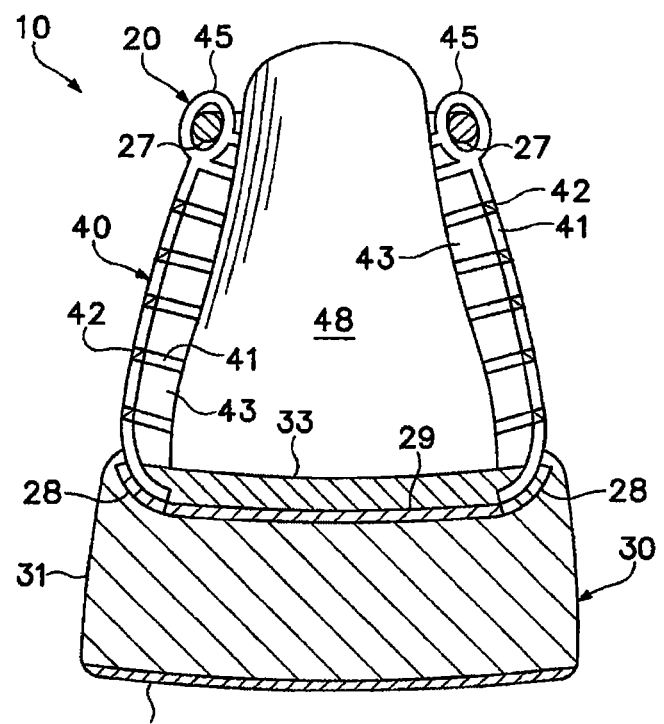
FIG. 4 is a cross-sectional view of the article of footwear, as defined by section line 4-4 in FIG. 1.

Matrix layer 40 is depicted in FIGS. 1-3 as forming a majority of upper 20. In further aspects or other example structures according to the invention, however, upper 20 may include multiple layers having different materials or different combinations of materials, and matrix layer 40 may form at least one of these layers or a portion of at least one of these layers (e.g., an exterior-most layer, an intermediate layer, etc.). As an example, an element having the general configuration of matrix layer 40 may be limited to forefoot region 11 or heel region 13, with a remainder of upper 20 having another configuration. Furthermore, a bootie or sock may be placed into the void within upper 20 such that the bootie or sock receives the foot and extends between the foot and matrix layer 40 when footwear 10 is worn. Other example footwear and upper constructions will be described in more detail below.

The thicknesses of the various segments 41 of the matrix layer 40 may be substantially constant throughout the upper structure 20. In some embodiments, however, the thicknesses of segments 41 may taper or otherwise change between edges 44a and 44b, e.g., such that segments 41 have greater thickness adjacent edge 44a and a lesser thickness adjacent edge 44b. The thicknesses may also vary such that segments 41 in heel region 13 are thinner or thicker than segments 41 in regions 11 and 12, for example. Other thickness distributions are possible without departing from the invention. The cross-sectional shape of segments 41 may also vary, e.g., to include circular, elliptical, square, rectangular, triangular, flat, or other shapes, for example. If formed from an elliptical or rectangular shape, the cross-section may have a greater length and/or width than thickness, and the longer or wider surfaces may be arranged so as to lie adjacent the foot.

Figure 7A:
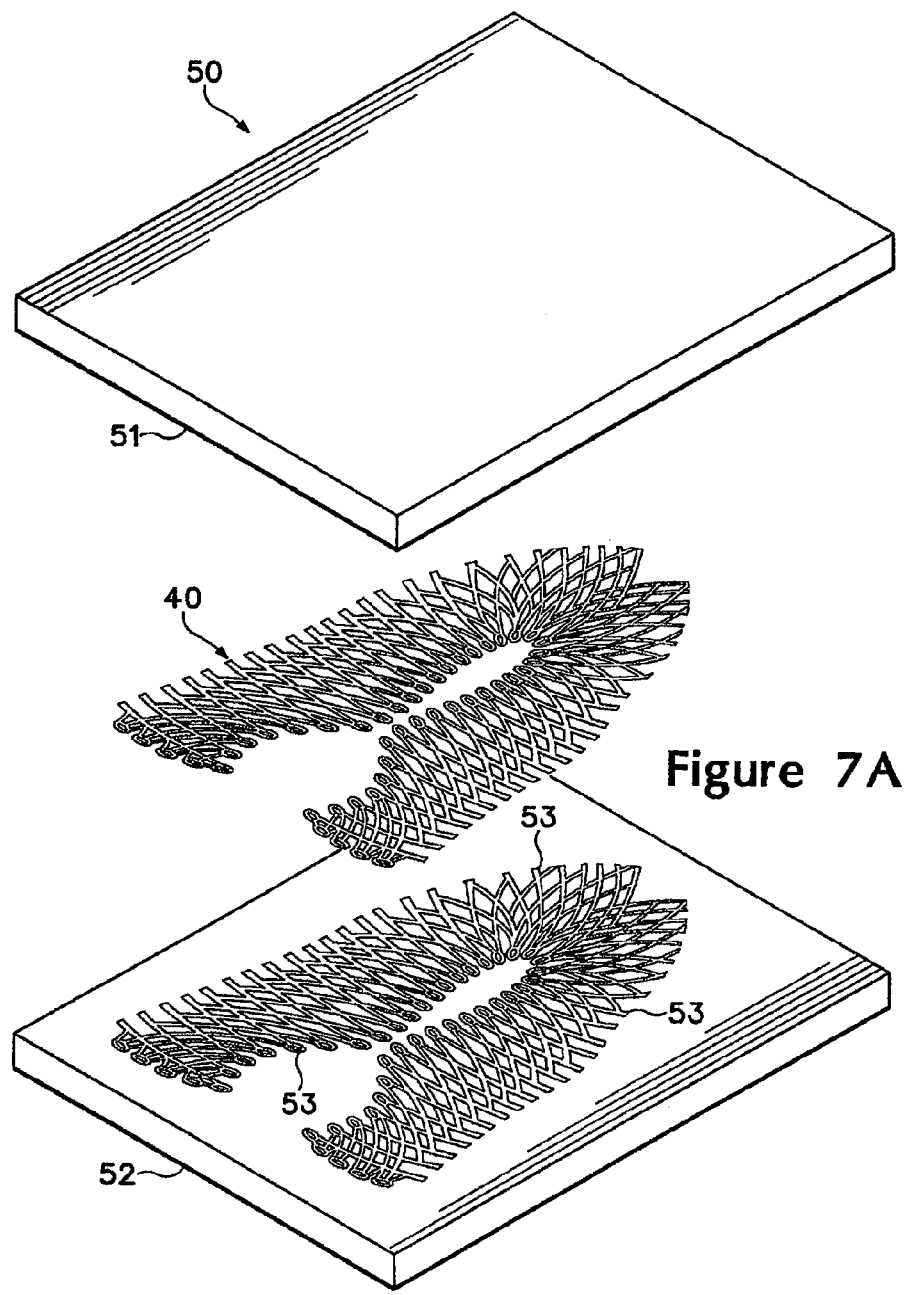
FIGS. 7A-7D depict steps in an example manufacturing process of articles of footwear in accordance with this invention.

One example of the manner in which footwear 10 in accordance with examples of this invention may be manufactured now will be discussed with reference to FIGS. 7A-7D. Matrix layer 40 may be formed of unitary (i.e., one-piece) construction from polymer materials in a mold 50, as depicted in FIG. 7A. Mold 50 includes an upper portion 51 and a lower portion 52. As depicted, a surface of lower portion 52 includes an indented area 53 having the general shape of matrix layer 40. As an alternative, upper portion 51 or both of portions 51 and 52 may have indented portions in the shape of matrix layer 40. In use, portions 51 and 52 are placed in an overlapping and contacting position, and a polymer material is injected into indented area 53. Upon curing or hardening of the polymer material, portions 51 and 52 are separated and matrix layer 40 is removed, as depicted in FIG. 7A.

Figure 7B:
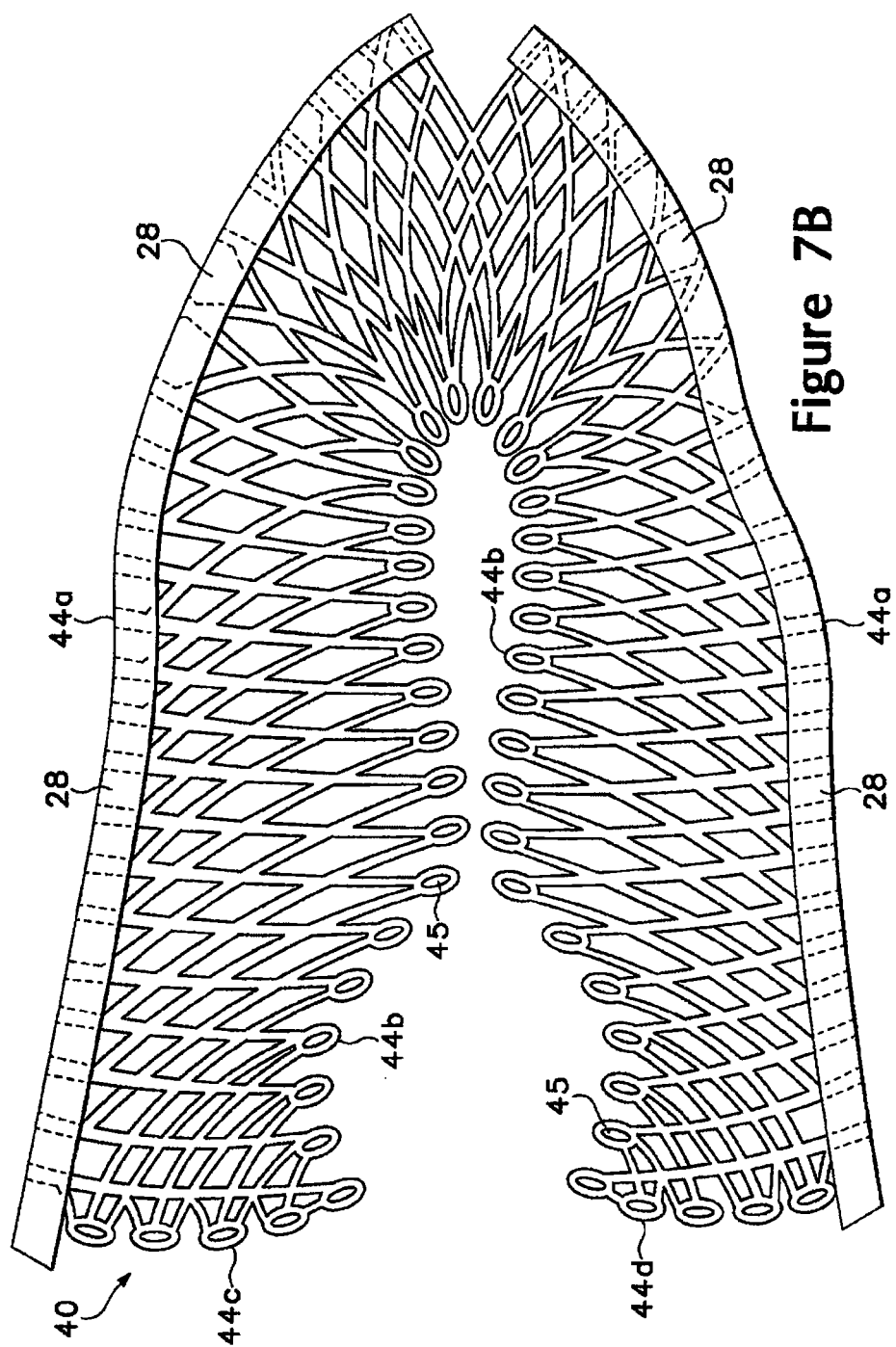

Upon removal of matrix layer 40 from mold 50, one or more layers of a lasting element 28 (or other batting material) may be secured adjacent to at least edge 44a, as depicted in FIG. 7B. Lasting element 28 may be sewn, adhesively applied, or otherwise secured to matrix layer 40. When matrix layer 40 is formed from a thermoplastic polymer, however, bonding may be used to join matrix layer 40 to lasting element 28. Suitable materials for lasting element 28 include various textiles, whether woven or non-woven, or polymer sheet materials, for example. The lasting element 28 may extend adjacent one or both sides of the matrix layer 40. As an alternative, lasting element 28 may be provided in mold 50 (e.g., in indented area 53) prior to injecting the polymer material. When the polymer material is injected into mold 50, portions of the polymer material contact lasting element 28 may cure or otherwise harden or become polymerized, thereby securing lasting element 28 to matrix layer 40. In some embodiments, a glueless configuration may be utilized wherein portions of matrix layer 40 are mechanically joined to lasting element 28. As yet another example, if desired, the lasting element 28 may be formed as a unitary structure with the matrix layer 40 (e.g., integrally molded as part of the matrix layer 40, etc.). Any desired manner of securing lasting element 28 (or other batting material) to matrix layer 40 may be used without departing from this invention. Also, if desired, a unitary material may form the entire lasting element 28 (or other batting material) (extending completely around the exterior perimeter), or multiple lasting element portions 28 (or other batting material portions) may be provided along either or each edge 44a.

Figure 7C:
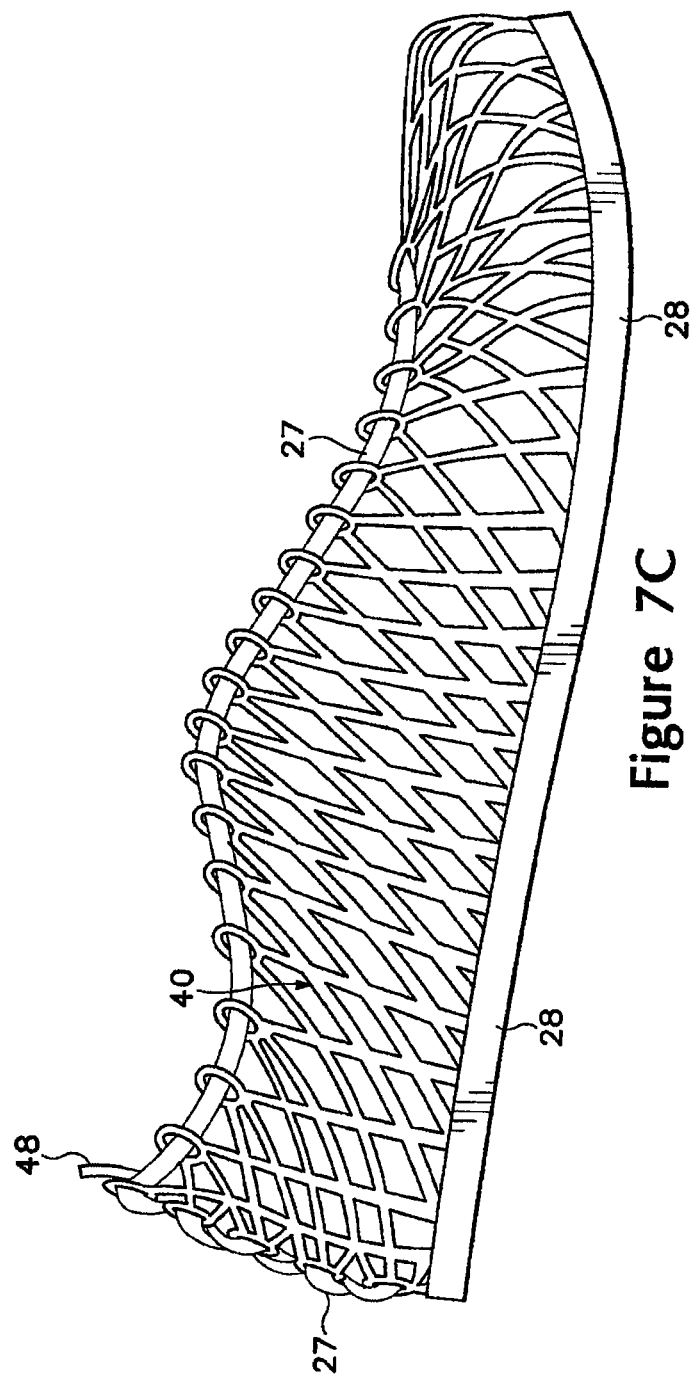

Once lasting element 28 is secured to or otherwise provided along edge 44a, cord 27 may be incorporated into matrix layer 40 in this illustrated example structure, as depicted in FIG. 7C. As noted above, cord 27 extends through loops 45 and is utilized to join edges 44c and 44d to each other. More particularly, in this example structure, cord 27 extends through loops 45 in throat area 24, through loops 45 adjacent to ankle opening 26, and through loops 45 that form edges 44c and 44d. Prior to incorporating cord 27, edges 44c and 44d are placed adjacent to each other, e.g., in an upright or generally vertical manner. Cord 27 is then extended through loops 45 along edges 44c and 44d to join edges 44c and 44d to each other. As seen in FIG. 7C, incorporating cord 27 into matrix layer 40 in this manner begins to form matrix layer 40 into the general shape of upper 20. In addition, heel element 48 (examples of which will be described in more detail below) may be incorporated into the overall structure at this time. As an alternative to using a single cord 27, two or more cords 27 may be utilized, as discussed in greater detail below (e.g., one in the rear heel area, one along the ankle opening, one along the throat area, etc.).

Figure 7D:
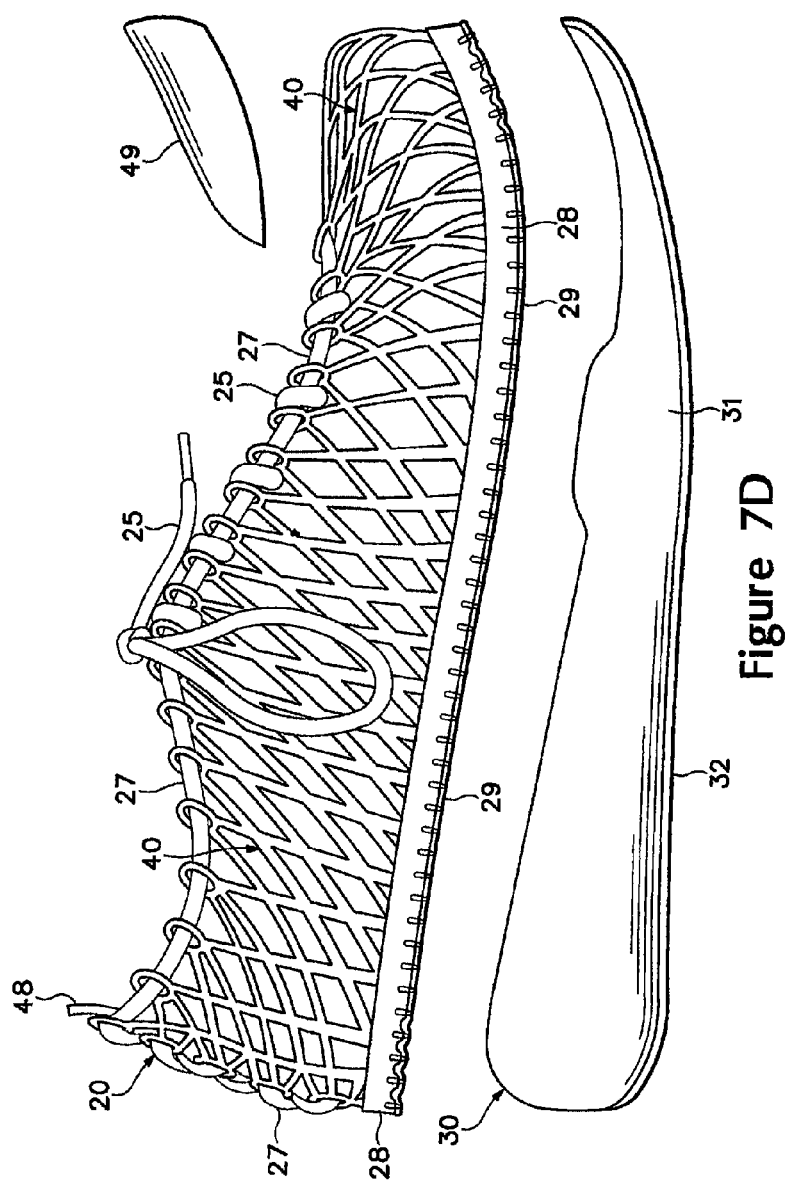

A further step in this example process for manufacturing footwear 10 is depicted in FIG. 7D, wherein a lace 25 and a strobel sock 29 are joined with matrix layer 40. When cord 27 extends though loops 45, apertures are formed between various segments 41 and cord 27 in at least throat 24, and lace 25 may be threaded through these apertures. Accordingly, lace 25 may be incorporated into upper 20 so as to extend in a zigzag or other pattern across throat 24 (e.g., in a conventional manner). Strobel sock 29 forms a lower surface of the void within upper 20. As discussed above, lasting element 28 is joined to edge 44a. In order to join strobel sock 29 to matrix layer 40, strobel sock 29 may be stitched, adhesively-bonded, or otherwise joined to lasting element 28. Sole structure 30 (of any desired construction) is then joined to upper 20 to effectively complete the manufacture of footwear 10. In addition, if desired, toe element 49 (such as a toe cap, if desired) may be incorporated at this time. In some embodiments, a glueless configuration may be utilized wherein portions of matrix layer 40 or lasting element 28 are mechanically joined to sole structure 30. Furthermore, in areas where matrix layer 40 extends around forefoot region 11 or heel region 13, lasting element 28 may be gathered, as depicted in FIG. 7D, to facilitate the rounded configuration of the upper 20 in these areas. That is, lasting element 28 facilitates gathering of matrix layer 40 during the manufacturing process.

In conventional articles of footwear, the upper is formed to accommodate footwear having a specific size. For example, an upper that is formed for a size 10 is larger than an upper that is formed for a size 9.5. One advantage to utilizing matrix layer 40 is that one size of matrix layer 40 may be used in a range of footwear sizes. For example, a single mold may be utilized to form five substantially identical matrix layers 40, and the matrix layers 40 made from this single mold may be incorporated into individual articles of footwear that are sized from 8 to 10. As discussed above, matrix layer 40 is configured to have greater extensibility in the direction that is generally parallel to edges 44a and 44b. By stretching matrix layer 40 as it is incorporated into an upper, matrix layer 40 may be incorporated into footwear having successively larger sizes. In some circumstances, compressing matrix layer 40 may be utilized to incorporate matrix layer 40 into successively smaller articles of footwear. That is, an individual matrix layer 40 may be incorporated into articles of footwear sized to accommodate a range of foot sizes, as depicted in FIG. 8.

The ability to utilize an individual matrix layer 40 in a variety of footwear sizes enhances the manufacturing efficiency of footwear 10. An individual matrix layer 40 also may be utilized to form footwear 10 to accommodate either the right foot or left foot. As depicted in FIG. 5, matrix layer 40 has a generally symmetrical structure and may, therefore, be incorporated into either the right foot or left foot versions of footwear 10. In circumstances where matrix layer 40 is not symmetrical, merely flipping or otherwise reversing the orientation of matrix layer 40 may permit an individual matrix layer 40 to accommodate either the right foot or left foot. Accordingly, the manufacturing efficiency of footwear 10 is further enhanced in that one configuration of matrix layer 40 is suitable for either the right foot or left foot versions of footwear 10.

Figure 9A:
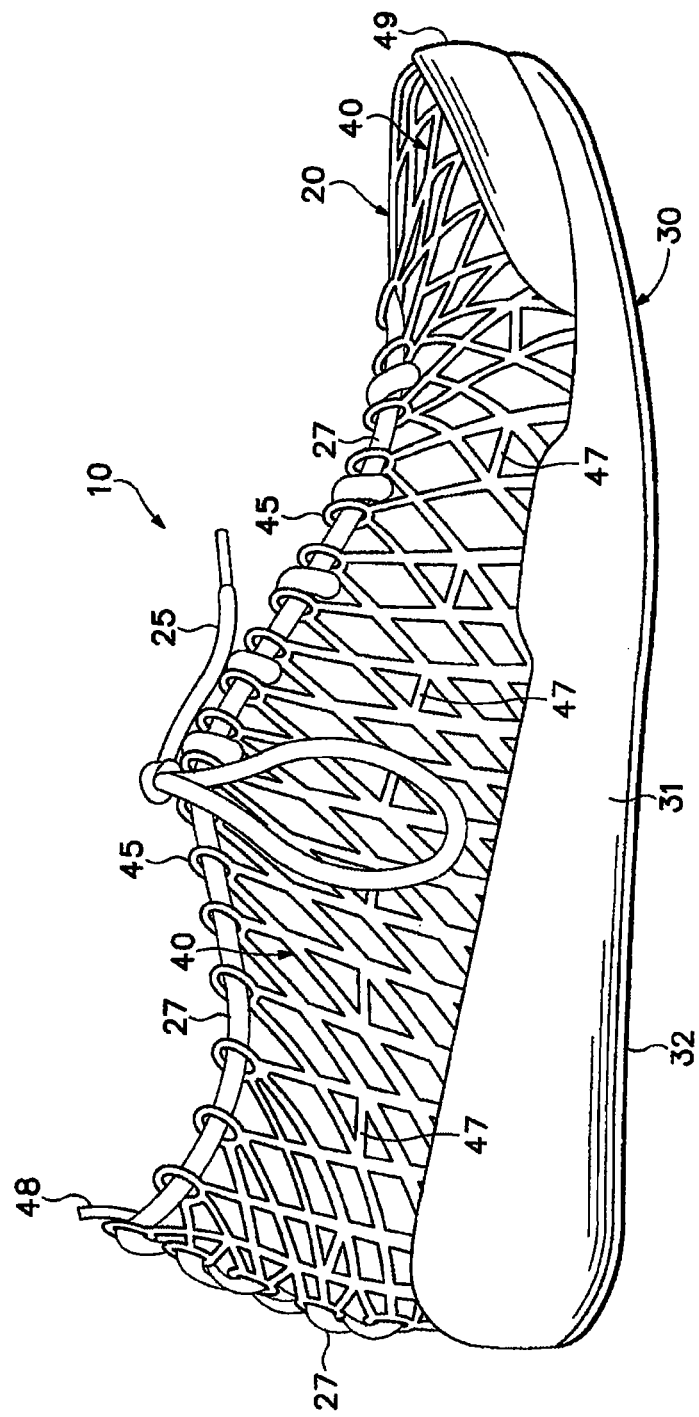
FIGS. 9A-9F are lateral side elevational views of various additional example configurations for articles of footwear in accordance with this invention.

As discussed above, matrix layer 40 is configured to have greater extensibility in the direction that is generally parallel to edges 44a and 44b than in the direction that is generally perpendicular to edges 44a and 44b. In some circumstances, a lesser extensibility in the direction that is generally parallel to edges 44a and 44b may be desired. One manner of changing the extensibility in the direction that is generally parallel to edges 44a and 44b involves modifying the radian measurements of angles 46a-46d. This has an effect, however, of also changing the extensibility in the direction that is generally perpendicular to edges 44a and 44b. One way of changing the extensibility in the direction that is generally parallel to edges 44*a* and 44*b* without substantially changing the extensibility in the direction that is generally perpendicular to edges 44*a* and 44*b* includes providing one or more connecting members 47, e.g., as depicted in FIG. 9A. Connecting members 47 in this illustrated example bisect selected apertures 43 and extend from angle 46*c* to angle 46*d* to limit the degree of stretch in these apertures 43. Other connecting member sizes, shapes, orientations, or arrangements also may be used without departing from the invention.

Figure 9B:
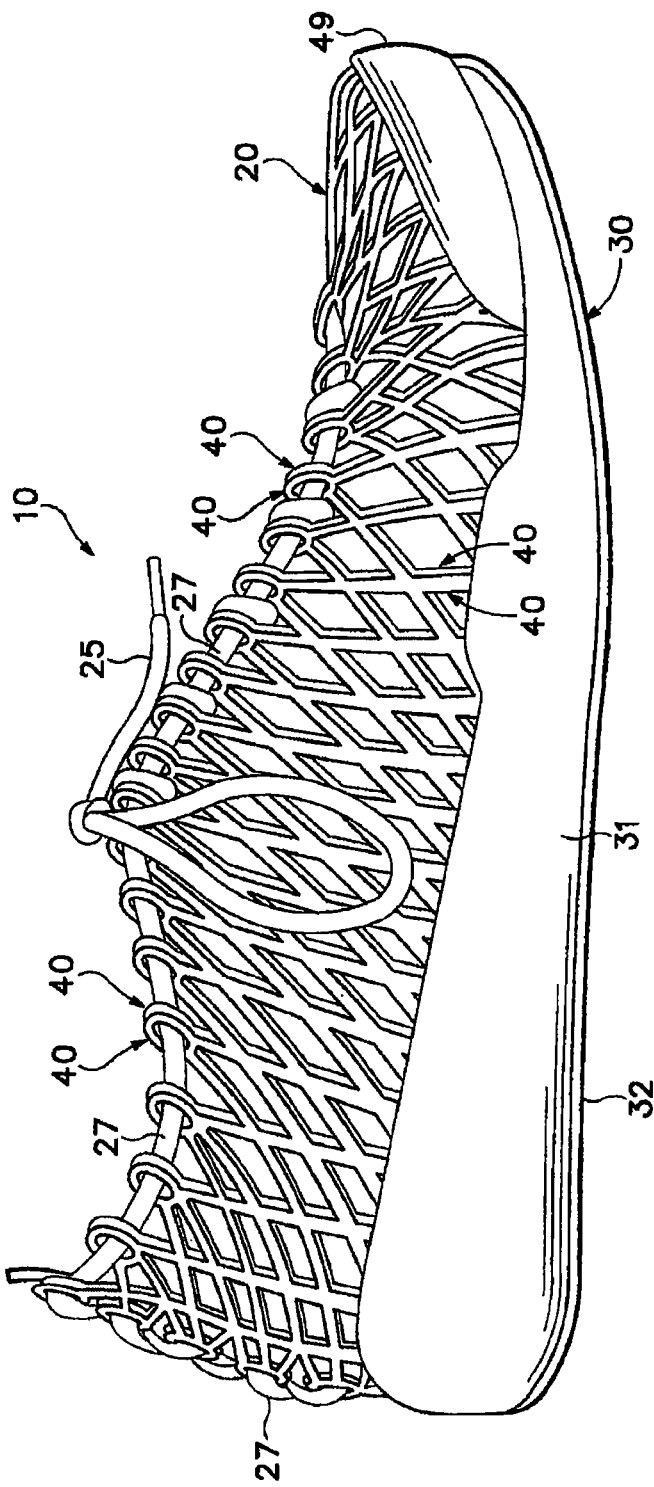

Footwear 10 is discussed above as incorporating a single matrix layer 40. With reference to FIG. 9B, a pair of matrix layers 40 is incorporated into an article of footwear 10. One of the matrix layers 40 generally forms an exterior surface of upper 20, and the other matrix layer 40 generally forms the interior surface of upper 20. That is, the matrix layers exhibit a coextensive, stacked relationship and alternately form the exterior and interior surfaces of footwear 10. Each of matrix layers 40 may be formed from the same materials, if desired. As an alternative, the matrix layer 40 forming the exterior surface may be formed from a material that is selected to resist wear, and the matrix layer 40 forming the interior surface may be formed from a material that is selected to provide comfort or enhanced tactile qualities (e.g., to more comfortably allow the wearer to go barefoot in footwear 10), for example. Accordingly, matrix layers 40 may be formed from different materials that cooperatively impart properties beneficial to footwear 10. While shown in FIG. 10 as forming a double matrix layer over the entire upper structure 20, if desired, the double layering may be provided only at a portion or portions of the overall upper structure 20. If desired, the two matrix layers 40 may have different colors to provide an interesting and unique visual appearance (although the same color matrices also may be used, if desired).

Figure 9C:
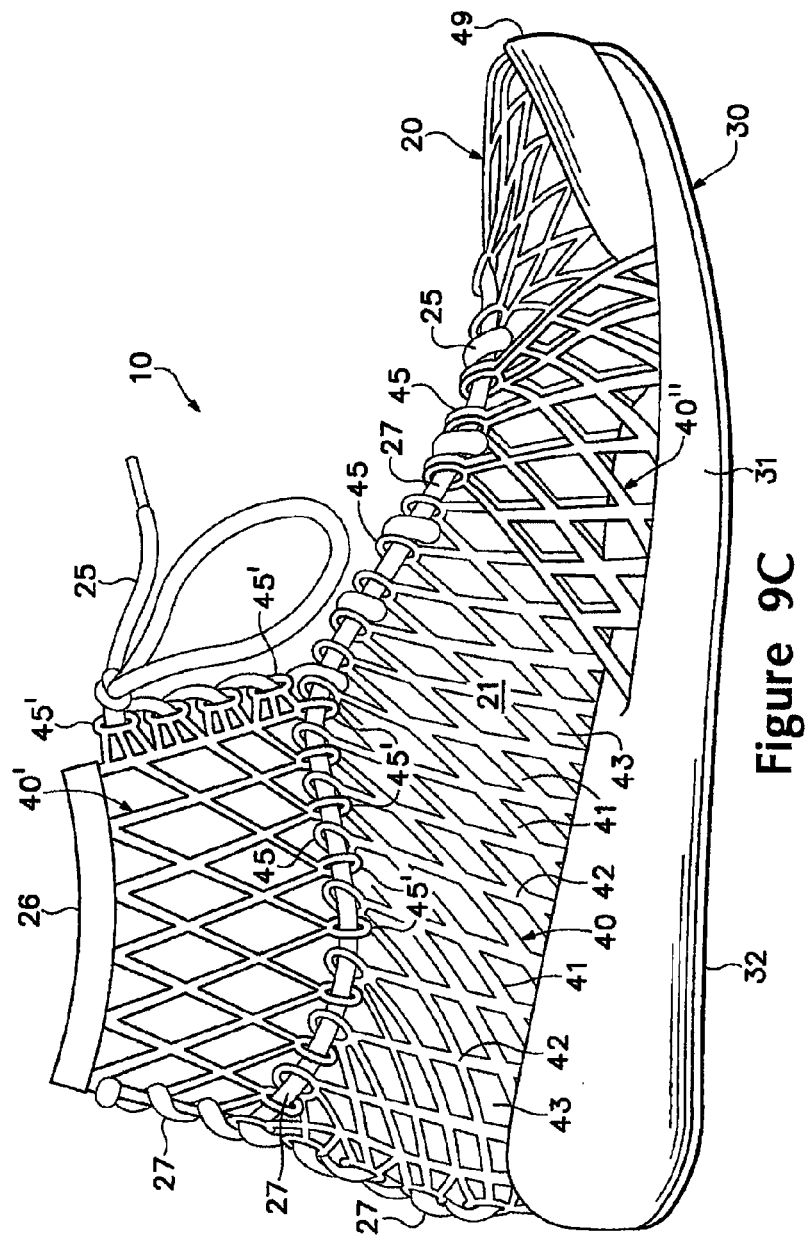

Footwear 10 is depicted in FIGS. 1-3 as having a configuration wherein ankle opening 26 extends around a lower area of the ankle. In FIG. 9C, however, footwear 10 is depicted as including an extension matrix 40' that extends around an ankle of the individual and raises the location of ankle opening 26 to an upper area of the ankle (e.g., to produce a "high top" article of footwear 10). As depicted, extension matrix 40' includes various loops 45' that are similar to loops 45 and receive cord 27, thereby joining extension matrix 40' with footwear 10. Cord 27 in this example structure extends upward to join edges of extension matrix 40' along the rear surface of heel region 13, and lace 25 extends along a forward portion of extension matrix 40'. By adjusting each of cord 27 and lace 25, the manner in which matrix layer 40' fits around the ankle may be modified. Extension matrix 40' is discussed above as being an element that is separate from matrix layer 40. In some embodiments, however, if desired, extension matrix layer 40' may be formed of unitary construction with matrix layer 40 (e.g., without the need for cord 27 to connect separate parts).

As discussed above for matrix layer 40, cord 27 extends though loops 45 and apertures are formed between various segments 41 and cord 27 in at least throat area 24. Lace 25 may then be threaded through these apertures. A similar configuration may be utilized for extension matrix 40'. As an alternative, and as depicted in FIG. 9C, lace 25 may extend directly through loops 45' provided for this purpose. Accordingly, loops 45 and/or loops 45' may receive lace 25, rather than cord 27, to form the lacing system. Additionally or alternatively, if desired, matrix 40 also may be formed to include lace 25 engaging loops, optionally separate loops from the loops 45 through which cord 27 extends (if any). In some structures according to the invention, if desired, the cord 27 may be eliminated or it may be provided in only certain areas, such as the heel area.

An additional example feature of the footwear structure 10 in FIG. 9C relates to a stability matrix 40" that is located on each of sides 21 and 22 and at or across the interface of forefoot region 11 and midfoot region 12. Stability matrix 40" overlaps a portion of matrix layer 40 and provides additional stability on the sides of the foot. As depicted, stability matrix 40" has a generally triangular shape, but may have a variety of other shapes and/or sizes within the scope of the invention. Stability matrix 40" is depicted as being positioned at the interface of forefoot region 11 and midfoot region 12, but this or other similar elements may be located in other areas of footwear 10 (e.g., to provide a double layer of the matrix at any desired location(s)). Although stability matrix 40" is depicted as being secured to an exterior of sole structure 30, stability matrix 40" may also be secured in other locations including in the same manner as matrix layer 40 (e.g., lasted between a midsole and an outsole, lasted between midsole structures, etc.). Again, if desired, the matrix layer 40 and the stability matrix 40" may be made from different colors to provide an interesting and unique visual appearance (although the same color matrices also may be used).

Figure 9D:
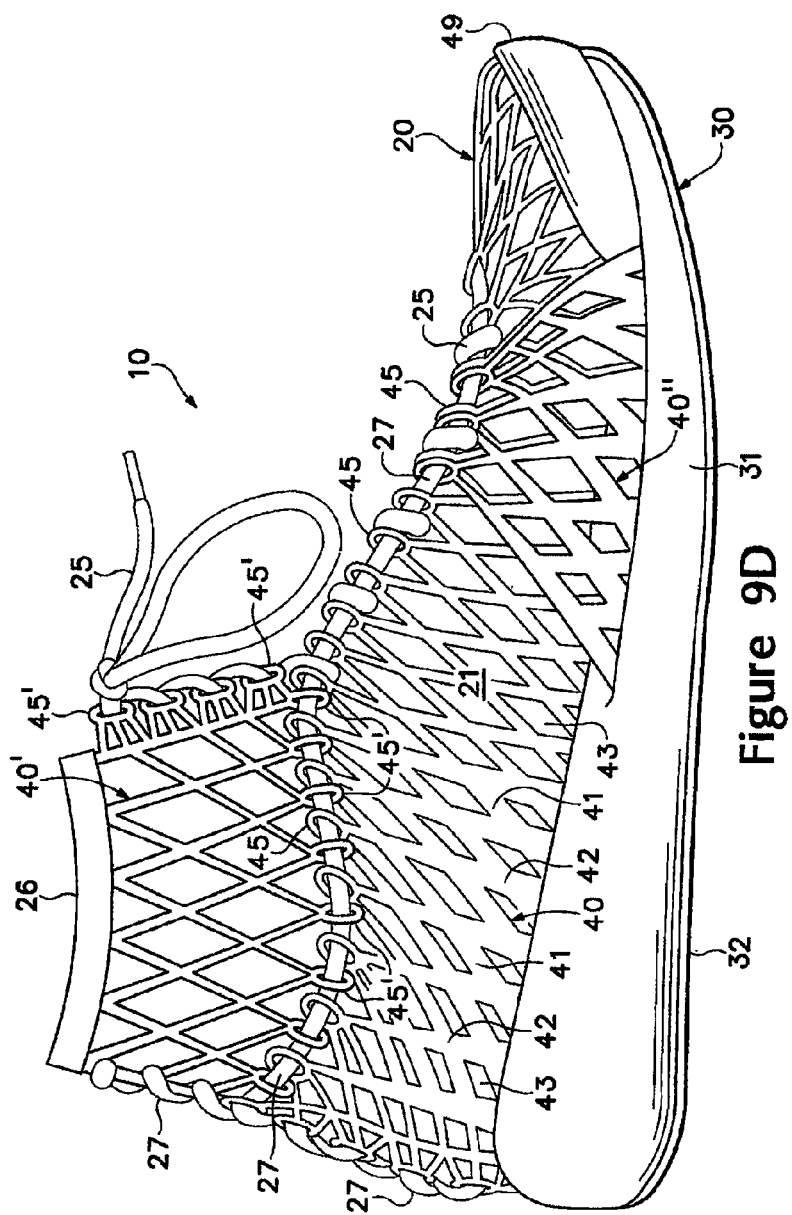

As discussed above, the width and/or thicknesses of segments 41 have an effect upon the degree to which matrix layer 40 stretches. In order to increase the lateral stability of footwear 10, the width and/or thicknesses of segments 41 may be selectively increased, e.g., as depicted in FIG. 9D, to provide additional stability, e.g., at certain locations, during lateral or other types of movements, etc. As depicted, segments 41 in heel region 13 and portions of midfoot region 12 exhibit increased width and/or thickness (and aperture 43 area is decreased). In addition, segments associated with stability matrix 40" also exhibit increased width and/or thickness. In some embodiments, other areas of matrix layer 40 and portions of extension matrix 40' (if any) may exhibit increased width and/or thickness. Accordingly, increased width and/or thickness of segments 41 may be utilized in any desired area of footwear 10 to impart additional stability, wear resistance, etc.

Figure 9E:
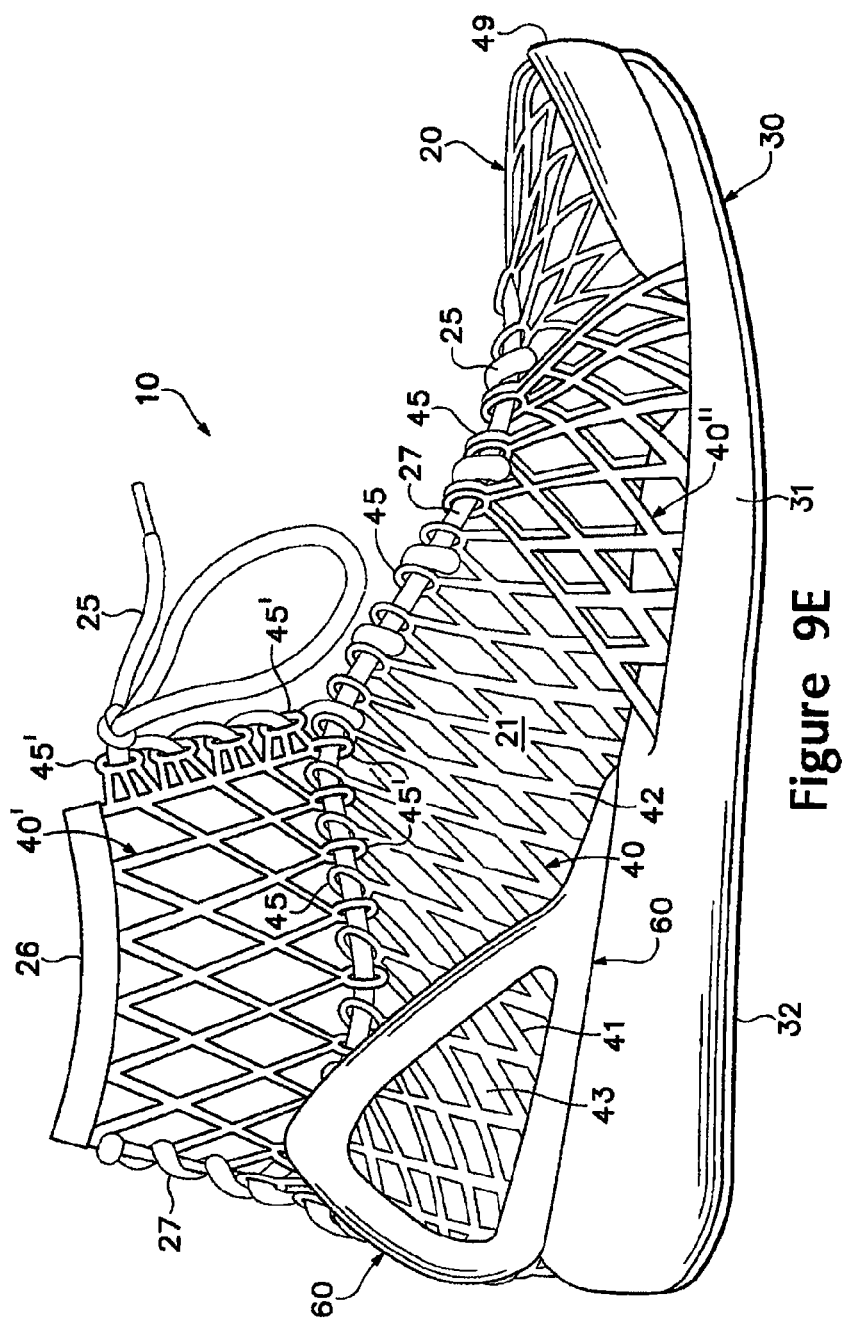

When used for sports such as basketball, additional stability for the heel and/or other areas of the foot may be beneficial, e.g., during lateral movements. Increasing the width and/or thickness of segments 41 is one manner in which additional stability may be provided. Alternatively or in combination, a reinforcing structure 60 may be incorporated into upper 20, e.g., as depicted in FIG. 9E. More particularly, one or more reinforcing structures 60 may be secured to sole structure 30 and/or to an exterior of matrix layer 40 so as to extend around heel region 13 (and/or other regions of the footwear structure) and impart additional stability. In further embodiments, other configurations of reinforcing structure 60 may be located in midfoot region 12 to provide support for the arch of the foot, or other configurations of reinforcing structure 60 may be located in forefoot region 11. Accordingly, a variety of reinforcing structures may be incorporated into upper 20 in order to impart additional stability.

Figure 9F:
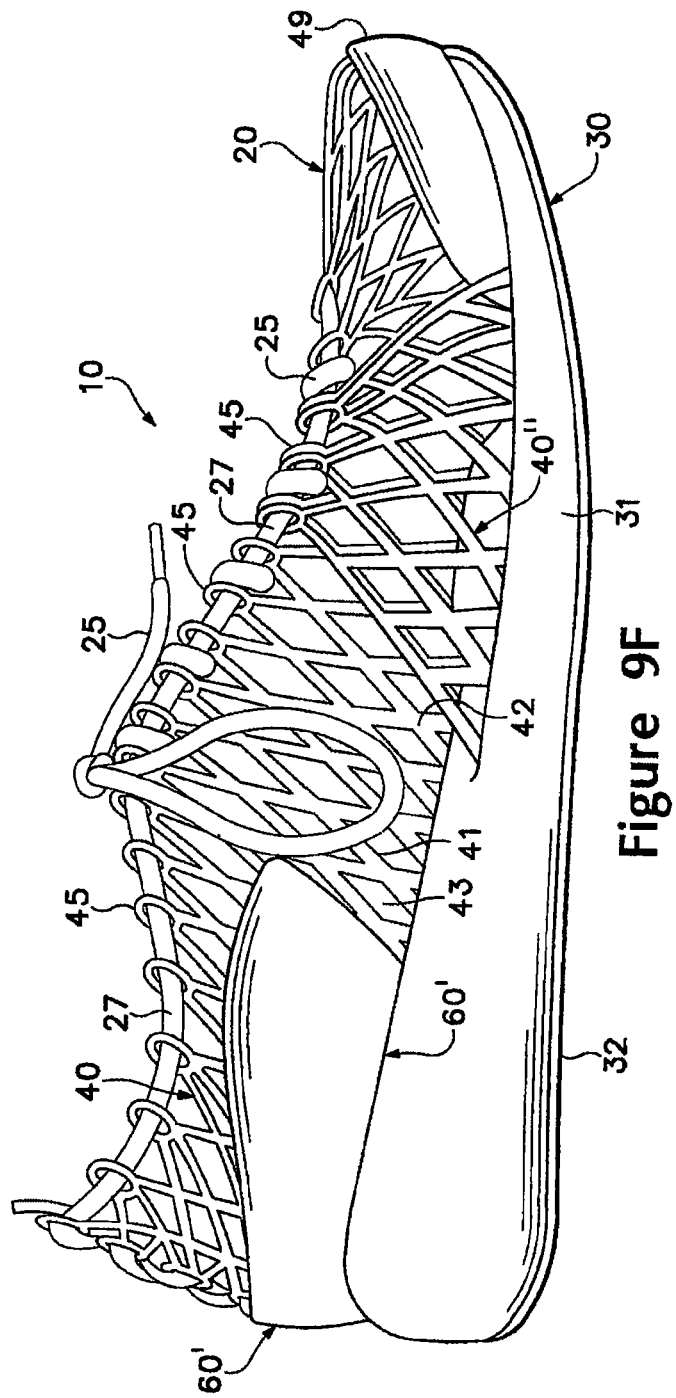

Various concepts discussed above in relation to FIGS. 9C-9E also may be applied to other configurations of footwear 10. With reference to FIG. 9F, stability matrix 40" is incorporated into footwear 10 having a configuration that is suitable for running, tennis, or cross-training, for example.

Furthermore, a reinforcing structure 60' having a plate-like configuration is incorporated into heel region 13 of this example footwear structure.

Figure 10A:
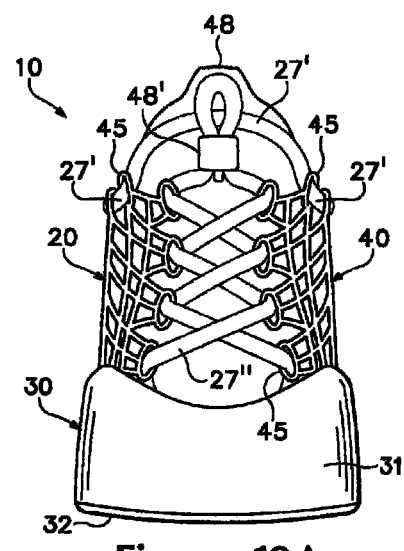
FIGS. 10A-10B are rear elevational views of an additional example configuration for the article of footwear.
Figure 10B:
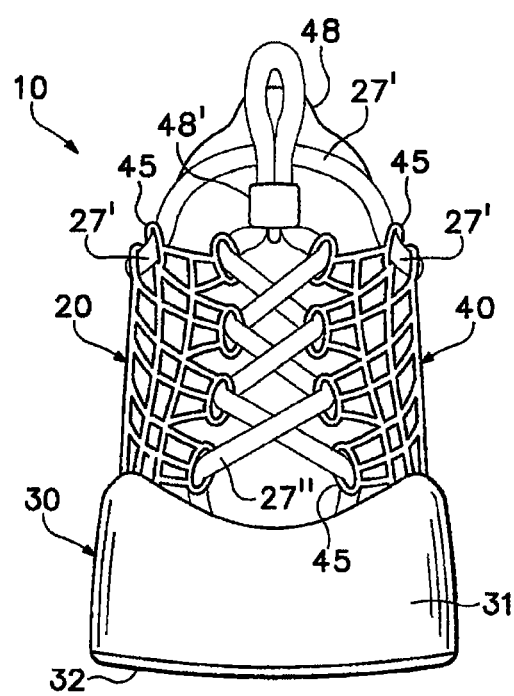

Two or more cords 27 may be utilized in the footwear structure 10 as an alternative to using a single cord 27. With reference to FIG. 10A, a first cord 27' may extend through loops 45 in throat 24 and through loops 45 adjacent to ankle opening 26. A second cord 27" may extend through loops 45 that form edges 44c and 44d. In addition, second cord 27" may extend through a fastener 48' that is secured to heel element 48 and cinches second cord 27" to retain the relative position of second cord 27". Any type of fastener 48' may be used without departing from this invention, including mechanical fasteners that are conventional and known in the art. In this arrangement, each of the two cords 27' and 27" may be independently adjusted to enhance the fit of footwear 10. For example, the individual may pull upward on an upper portion of second cord 27" to tighten and enhance the fit in heel region 13, as depicted through a comparison of FIGS. 10A and 10B. Similarly, the individual may loosen second cord 27" to provide additional volume in heel region 13. In effect, tightening and loosening second cord 27" moves the relative positions of edges 44c and 44d (i.e., decreases or increases the space between edges 44c and 44d) to adjust the fit in heel region 13. In some embodiments, protrusion structures may be formed along edge 44c that extend through loops 45 provided along edge 44d in order to join edges 44c and 44d (and the cord 27" may be omitted). As another example, if desired, free ends of cord 27" may be provided and tied together in the heel regions, rather than using fastener 48'. Accordingly, structures other than cords 27 and/or 27" and/or fastener 48' may be utilized to join edges 44c and 44d. Some additional examples of such structures will be described in more detail below.

Figure 11:
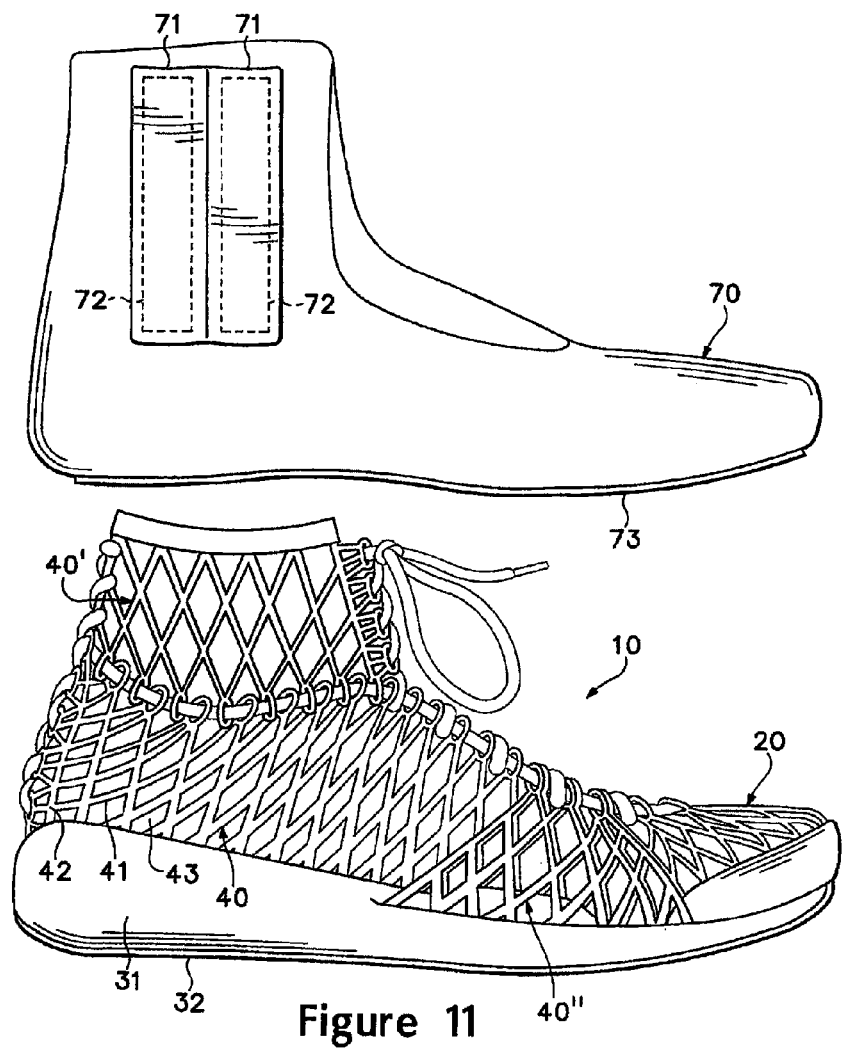
FIG. 11 is a lateral side elevational view of yet another example configuration for the article of footwear.

Footwear 10 may be worn such that matrix layer 40 is immediately adjacent the foot or a sock that extends around the foot. In some embodiments, however, a liner 70, e.g., as depicted in FIG. 11, may extend between matrix layer 40 and the foot. Liner 70 generally has a shape that corresponds with a shape of the void defined within upper 20. In order to impart additional stability to footwear 10, a textile material forming liner 70 may have various pockets 71 that receive semi-rigid supports 72 (e.g., plastic panels, etc.). Pockets 71 and supports 72 may extend in a generally vertical direction, e.g., to provide support along the medial and lateral sides of the ankle. Alternatively, supports 72 may extend around the ankle or adjacent to other portions of the foot.

In order to prevent significant movement between upper 20 and liner 70, a lower surface of liner 70 may incorporate a fastener 73 and the interior of upper 20 may incorporate a corresponding fastener. If, for example, fastener 73 is a hook portion of a hook and loop fastening system, the loop portion may be positioned within upper 20. Fastener 73 may also be a non-slip material, such as neoprene, that is located on a lower surface of liner 70 and a lower surface of the void within upper 20. When liner 70 is placed within upper 20, fastener 73 will effectively limit further movement of liner 70 relative to upper 20, thereby securely positioning the foot. Other types of securing systems may also be utilized in place of the hook-and-loop fastening system of fastener 73, including, for example, snaps, buttons, adhesives, complementary retaining structures (such as slots, grooves, ridges, etc.), etc. In addition, the location of fastener 73 may vary to include locations other than the lower surface of liner 70, including sides and the back surface. Accordingly, the type of fastener and location may vary significantly.

Liner 70 generally enhances the comfort of footwear 10. During some movements, portions of matrix layer 40 may contact and exert pressure upon the foot, and liner 70 serves to modulate the pressure and distribute it over a greater area of the foot. Foam materials may be incorporated into liner 70 in order to further enhance the comfort, and the materials of liner 70 also may be air permeable to cool the foot and allow for the dissipation of perspiration. The materials forming liner 70 also may be waterproof or water resistant. Alternatively, if desired, rather than providing an entire liner 70, an inner surface of matrix layer 40 may be provided with (e.g., lined with) a textile, foam, or other comfort-enhancing material.

Figure 12:
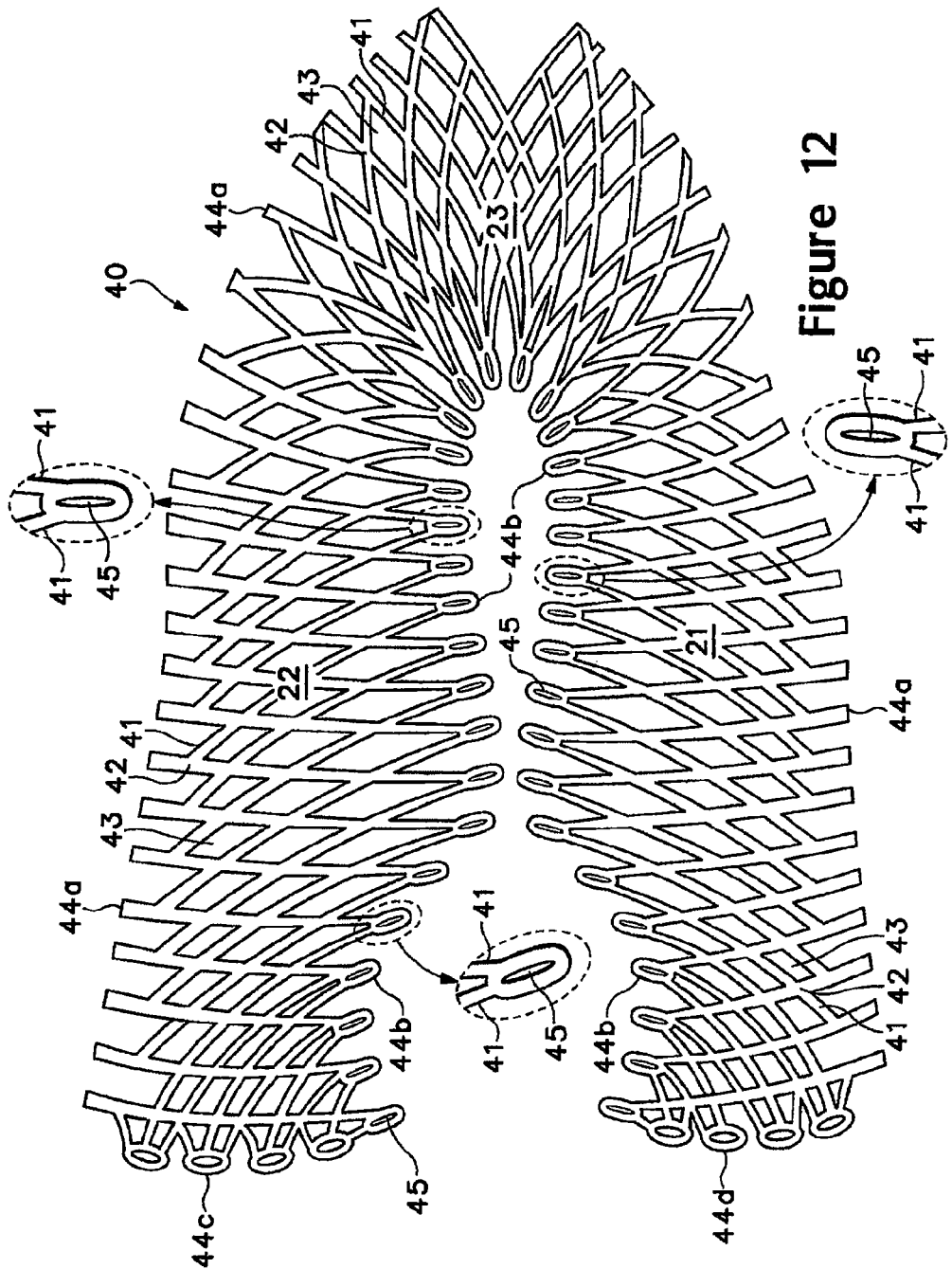
FIG. 12 is a top plan view of another example configuration of the matrix layer.

When cord 27 extends through loops 45, loops 45 may twist or otherwise rotate to accommodate cord 27. Although the material forming matrix layer 40 may be sufficiently strong and flexible to accommodate this rotation, the rotation induces additional stresses into the material of matrix layer 40. With reference to FIG. 12, matrix layer 40 is depicted as having a configuration wherein loops 45 are formed to have a twisted or rotated configuration. In FIG. 5, loops 45 are coplanar with a remainder of matrix layer 40. In contrast, FIG. 12 depicts a configuration wherein loops 45 are angled with respect to the remainder of matrix layer 40. That is, loops 45 are formed to have a twisted or otherwise rotated configuration that accommodates cord 27 without the necessity of significant additional twisting or rotation. In FIG. 12, loops 45 are depicted as being at a 45 degree angle with respect to the remainder of matrix layer 40, but may range from 5 to 90 degrees in further configurations.

Of course, wide variations in the structures, parts, and combinations of parts may be present in articles of footwear in accordance with examples of this invention. Various additional examples of such variations are described below in conjunction with FIGS. 13 through 21.

As one additional example, many variations in the matrix layer structure are possible without departing from this invention. FIGS. 1-12 illustrate several examples of matrix layer structures 40 that include variations in the overall size of the openings or apertures 43, the shapes of the apertures 43, the sizes of the segments 41, and the like. In the forefoot region 11 of the matrix layer structures 40 shown, for example, in FIGS. 3, 5, 7B, and 12, the apertures 43 are shown arranged substantially "radially" around the toe, e.g., the segments 41 emanate outward from a top vamp portion of the matrix structure 40 adjacent the throat 24 (near the last loops 45 along edge 44b) toward the medial, lateral, and toe portions of the overall structure. As illustrated in these figures, in these example structures 40, the apertures 43 are elongated in a radial direction around the forefoot region 11, i.e., from the top vamp portion toward the forefoot side and/or forefoot toe portions of the footwear structure.

Figure 13:
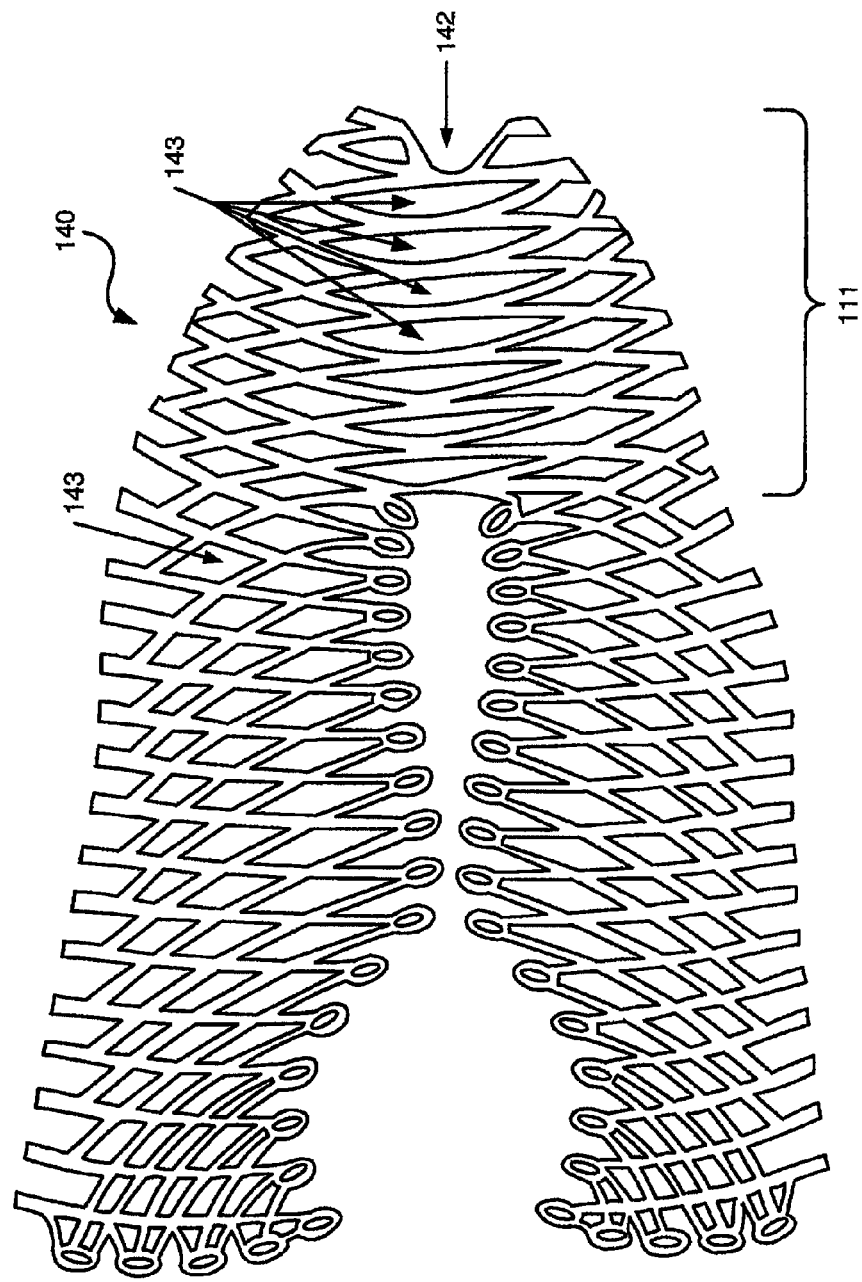
FIG. 13 illustrates an example matrix layer structure having transversely (medial-to-lateral side) extending apertures in the forefoot region.

FIG. 13 illustrates another example of a matrix layer structure 140. Matrix layer 140 may be similar to matrix layer 40 described in detail above (e.g., made from the same types of materials, having the same types of characteristics, etc.). One difference in matrix layer structure 140 as compared to matrix layer 40 relates to the arrangement of the apertures 143 in the toe or forefoot region 111. In the matrix layer structure 140 of FIG. 13, at least some of the apertures 143 in the forefoot region 111 are arranged such that their longest dimension extends substantially transverse across the matrix layer 140 (e.g., such that the longest part of the aperture 143 extends generally in the medial-to-lateral side direction). Any desired size of the apertures 143 and any desired number of transverse rows of apertures 143 may be provided in the forefoot region 111 without departing from this invention. In the example structure 140 illustrated in FIG. 13, the forefoot region 111 of the matrix layer 140 includes large apertures 143 down the central top/toe portion 142 of the matrix layer 140, with smaller apertures 143 provided down and along the medial and lateral sides. Once shaped into an upper structure (e.g., as shown in FIG. 3), these transverse rows of apertures 143 will extend across the top of the foot such that the longest dimension of the apertures 143 will extend substantially along the bending direction of a foot (the longitudinal direction of a foot bend line), e.g., during normal step, jump, or other activities.

In addition to the aesthetic and cosmetic differences from the radial arrangement illustrated in conjunction with FIGS. 3, 5, 7B, and 12, a forefoot transverse aperture 143 arrangement, e.g., like that illustrated in FIG. 13, can have various advantages. For example, providing the elongated dimensions of the apertures 143 in the transverse (medial-to-lateral side) direction may enhance comfort of the article of footwear because the overall toe or forefoot region 111 will bend more naturally along with the wearer's foot, e.g., during steps, jumps, or other activities. In some instances, "radially arranged" apertures 43 (e.g., like those shown in FIGS. 3, 5, 7B, and 12) will tend to "bunch-up," e.g., during a wearer's step or other flexing of the wearer's forefoot region 111, which can be less aesthetically pleasing and can cause some comfort issues (e.g., particularly for users that like to wear the footwear without a sock or other comfort layer between the foot and the matrix layer 40). While this bunching may be reduced or minimized in the radially arranged structures in various ways (e.g., by providing relatively small apertures 43 in the forefoot portion 11 of radially oriented aperture structures), the transverse aperture arrangement in the forefoot portion 111 shown in FIG. 13 also can reduce this bunching and enhance comfort, feel, and fit. Moreover, the transverse aperture arrangement shown in FIG. 13 may be used in conjunction with various additional features of footwear structures, e.g., as described above in conjunction with FIGS. 1-12B, as well as those described below in conjunction with FIGS. 14A through 21.

Other potential variations on the structures, parts, and combinations of parts that may be present in articles of footwear in accordance with examples of this invention involve structures and methods for securing the upper together in the rear heel region of the footwear structure (in such structures where securing is needed in these areas). The example structures shown in FIGS. 1-12 include a cord 27" that extends through loops 45 formed at the edges 44c and 44d making up the generally vertical rear heel portion of the upper structure. This arrangement, as described above particularly in conjunction with FIGS. 10A and 10B, allows users to secure the footwear to the foot and to adjust the overall footwear size and fit in this rear heel portion.

Figure 14A:
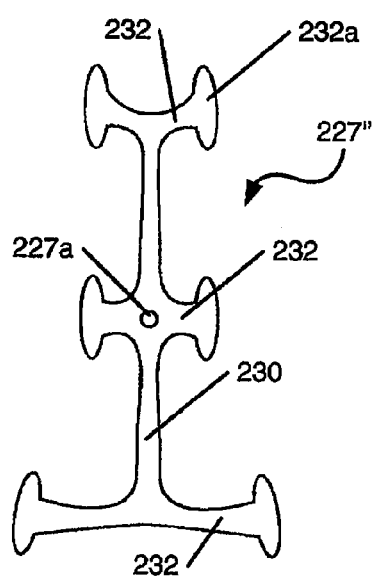
FIGS. 14A through 16B illustrate additional examples of heel securing arrangements for upper members in accordance with additional examples of this invention.
Figure 14B:
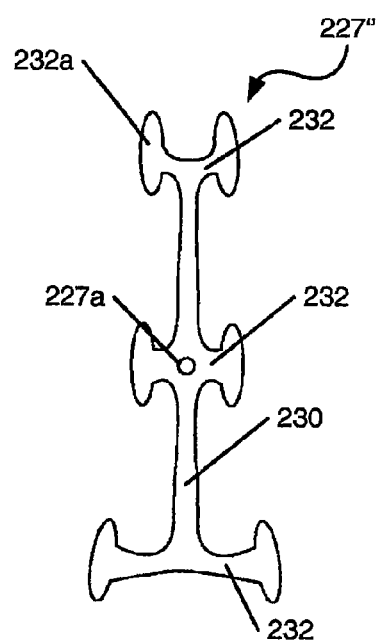
Figure 14C:
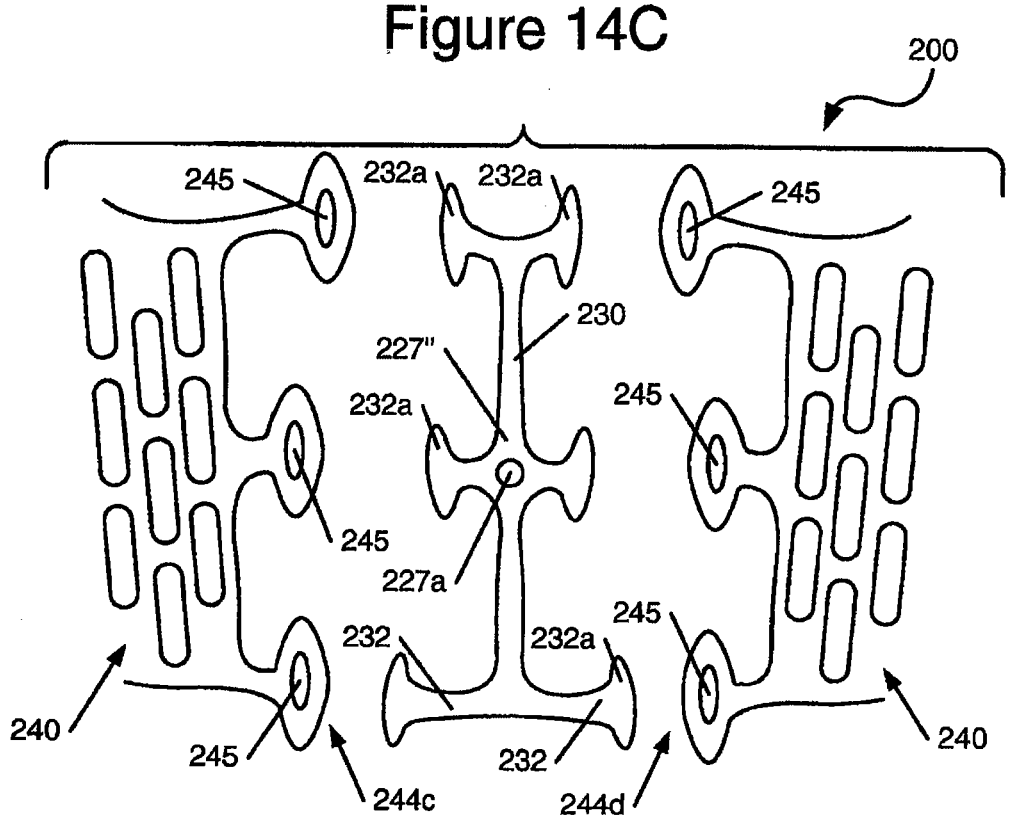
Figure 14D:
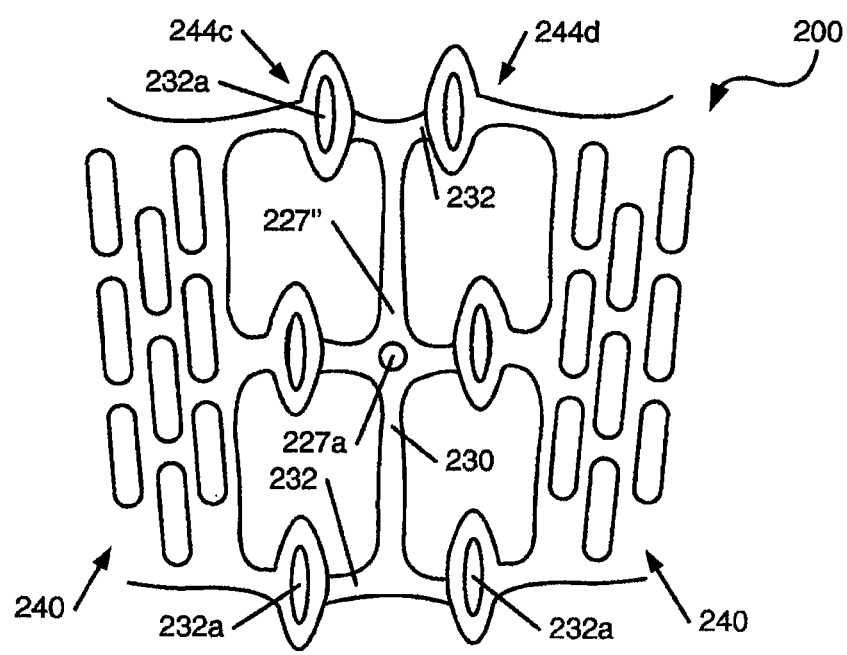

Additional and/or alternative ways of securing the matrix layer in this rear heel region (if necessary) may be used without departing from this invention. FIGS. 14A through 14D illustrate one example of such an example footwear securing structure 200. As shown in these figures, the rear heel region of the matrix layer 240 includes side edges 244c and 244d, e.g., in a manner similar to the similarly labeled parts in FIGS. 10A and 10B. Rather than a lace or cord element, in this example structure 200, the rear heel securing element 227" is a plastic member (or made from another material) that extends between side edge 244c and side edge 244d. The securing element 227" includes a central base region 230 with various branch arms 232 extending therefrom and toward the side edges 244c and 244d. The branches 232 include expanded end elements 232a that fit into the end apertures 245 provided along the side edges 244c and 244d, as illustrated in FIGS. 14C and 14D. While plastic materials are mentioned above, those skilled in the art will understand that the securing element 227" may be constructed from any desired materials or combination of materials without departing from this invention, including, for example, textiles, leathers, metals, etc.

To enable better fits for different individuals or for use under different conditions, different sized securing elements 227" may be provided. FIG. 14A illustrates a relatively wide securing element 227" (e.g., for use by wearers with wider feet, for use with thick or multiple pairs of socks, etc.), while FIG. 14B, on the other hand, illustrates a relatively narrow securing element 227" (e.g., for use by wearers with narrower feet, for use barefoot or with a thin sock, etc.).

The end elements 232a and apertures 245 may be sized and shaped in any desired manner, and these elements may fit together in any desired manner without departing from this invention. As one example, if desired, the end elements 232a may fit into apertures 245 in a manner akin to the manner that buttons fit into buttonholes (in fact, if desired, end elements 232a may include button-type elements). As another example, if desired, the end elements 232a may be formed from a flexible material that fits into a relatively stiff and unstretchable material making up the apertures 245 (e.g., a relatively stiff material making up at least the side edges 244c and 244d of the matrix layer 245). As another example, if desired, the end elements 232a may be formed from a relatively stiff material and the apertures 245 may be made from a relatively flexible and/or stretchable material. As yet another example, if desired, both the end elements 232a and the apertures 245 may be made from somewhat flexible materials (the same or different) such that they may be engaged together and disengaged from one another when desired, but they still maintain a reliable connection or engagement in use.

While a single securing element 227" is shown in FIGS. 14A through 14D, those skilled in the art will recognize that any number of securing elements 227" may extend between side edges 244c and 244d without departing from this invention. Also, a securing element 227" may have any number of branches 232 without departing from this invention. If desired, one or more securing elements 227" or branches 232 thereof may extend from side 244c to side 244d in an angled (e.g., in a direction from the top of side 244c to the bottom of side 244d or vice versa, etc.) without departing from this invention. Other securing arrangements also are possible.

Figure 15A:
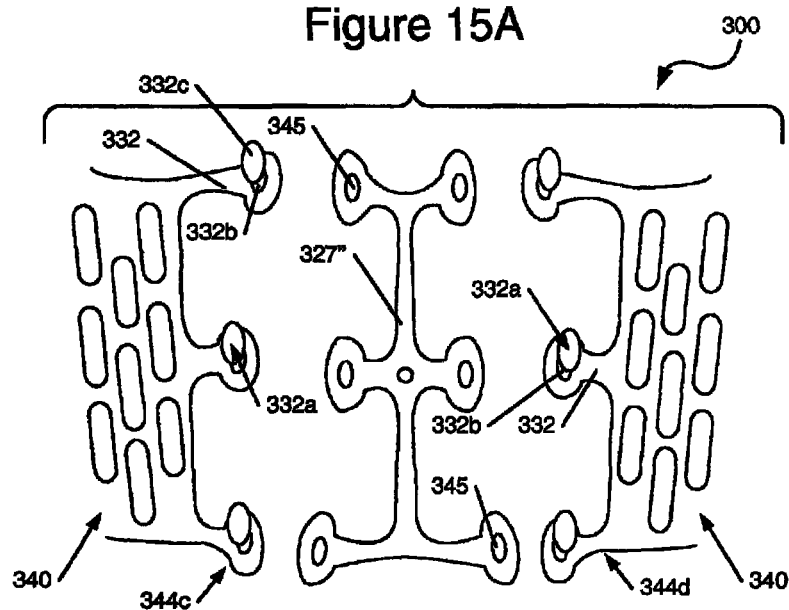
Figure 15B:
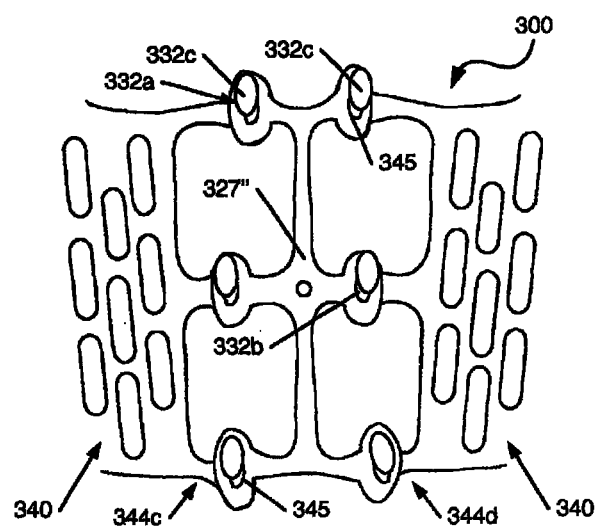

Another rear heel securing system and arrangement 300 is shown in FIGS. 15A and 15B. This example system and arrangement 300 is similar to that described above in conjunction with FIGS. 14A through 14D in that a rear heel securing element 327" (e.g., a plastic member) extends between side edge 344c and side edge 344d of a matrix layer 340 (e.g., like any of those described above). This system and arrangement 300 differs from that described above in conjunction with FIGS. 14A through 14D in that in this system and arrangement 300, the heel securing element 327" includes apertures 345 and the ends 332 of side edges 344c and 344d of the matrix layer 340 include elements 332a that extend into and engage the apertures 345 (again, optionally akin to a button and buttonhole arrangement as described above).

As evident from a comparison of end elements 232a and 332a and side edges 244c, 244d, 344c, and 344d in FIGS. 14A through 15B, the heel-engaging elements may take on a variety of forms without departing from the invention. In the arrangement 200 shown in FIGS. 14A through 14D, the end elements 232*a* are simply enlarged ends on the branches 232 of the securing element 227". In the arrangement 300 shown in FIGS. 15A and 15B, however, the end elements 332*a* include extending elements 332*b* and knob or enlarged portions 332*c* that extend outward (or substantially transverse) with respect to the main surface of end 332 (e.g., to help prevent the securing element 327" from slipping through and disengaging from apertures 345). Variations in structure (e.g., number of branches, dimensions, angles of branches, etc.) may be provided, e.g., in the manners described above in conjunction with FIGS. 14A through 14D.

Figure 16A:
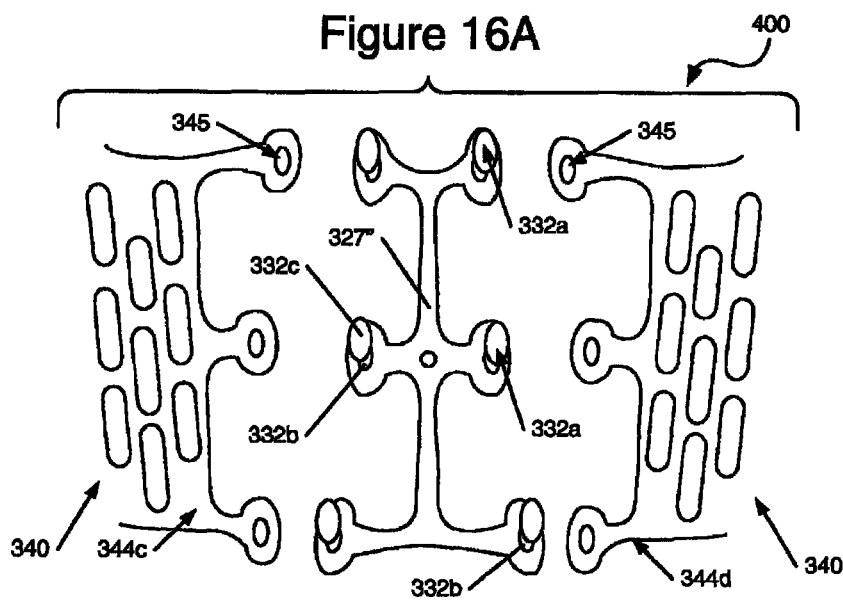
Figure 16B:
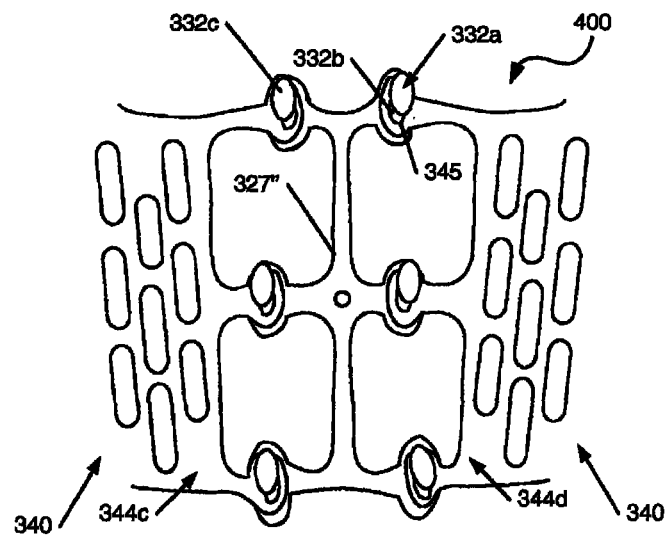

FIGS. 16A and 16B illustrate another rear heel securing system and arrangement 400. This arrangement 400 is similar to the arrangement 300 illustrated in conjunction with FIGS. 15A and 15B (and similar reference numbers are used in the figures) except that in this arrangement 400, the end elements 332*a* (including extending elements 332*b* and knob or enlarged portions 332*c*) are provided on the heel securing element 327" rather than on the side edges 344*c* and 344*d* of the matrix layer 340. Additionally, the apertures 345 are provided in the side edges 344*c* and 344*d* of matrix layer 340 rather than in the heel edge securing element 327".

Of course, other heel securing systems and arrangements are possible without departing from this invention. For example, if desired, either or both of the side edges (e.g., 244*c*, 244*d*, 344*c*, and 344*d*) may include a combination of apertures (e.g., 245, 345) and/or enlarged end elements (e.g., 232*a*, 332*a*) and the securing element (e.g., 227", 327") may include complementary and corresponding enlarged end elements and apertures. As another example, if desired, one side edge (e.g., 344*c*) may include only apertures (e.g., 345) and the other side edge (e.g., 344*d*) may include only enlarged end elements (e.g., 332*a*), while then the securing element (e.g., 327") may include an appropriate complementary combination of enlarged end elements and apertures. Other types of fastener arrangements may be used, such as snaps, turnbuckles, retaining member structures, hook-and-loop fasteners, other mechanical coupling and/or securing systems, etc. As still another example, if desired, the intermediate securing element 227" or 327" may be omitted and one side edge (e.g., 244*c*, 344*c*) of the matrix layer (e.g., 240, 340) may directly connect to the other side edge (e.g., 244*d*, 344*d*), for example, using enlarged end elements (e.g., 232*a*, 332*a*) and aperture structures (e.g., 245, 345) of the types described above (e.g., by providing such complementary engaging structures directly on the side edges of the matrix layer) and/or other fastener arrangements.

The heel securing systems and arrangements, when present in a footwear structure, need not be provided directly in the rearmost heel portion of the footwear structure. Rather, if desired, this securing system may be offset somewhat, e.g., to the lateral or medial side of the footwear structure without departing from this invention. As yet another example, if desired, the heel securing system and arrangement may be omitted, e.g., if the matrix is structured continuous in the overall heel portion (although such constructions may add complications or complexities in molding or other fabrication steps involved in forming the matrix material and/or a footwear structure including the matrix). As yet another example, as illustrated in more detail in conjunction with FIG. 21, the side edges in the heel region (e.g., 44*c* and 44*d*) may be fixed together in a permanent manner, in at least some structures according to this invention.

Figure 17B:
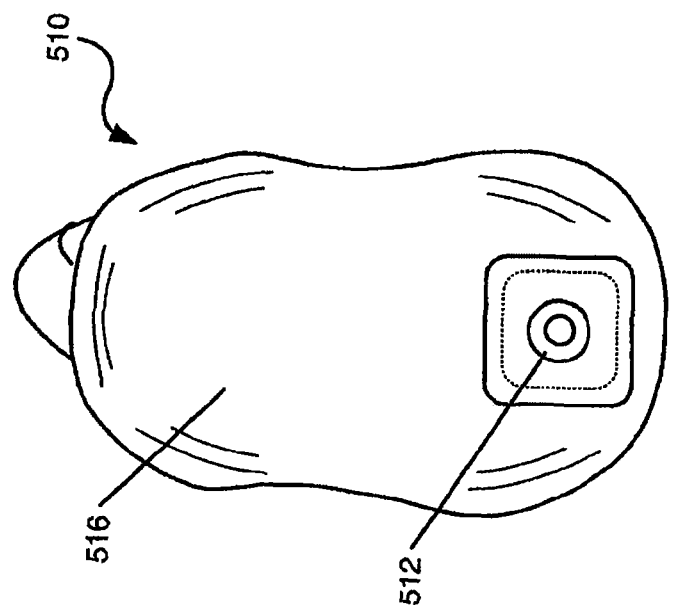
FIGS. 17A through 17C illustrate additional features of footwear structures according to some examples of this invention, including removable heel tongue and bootie elements.
Figure 17A:
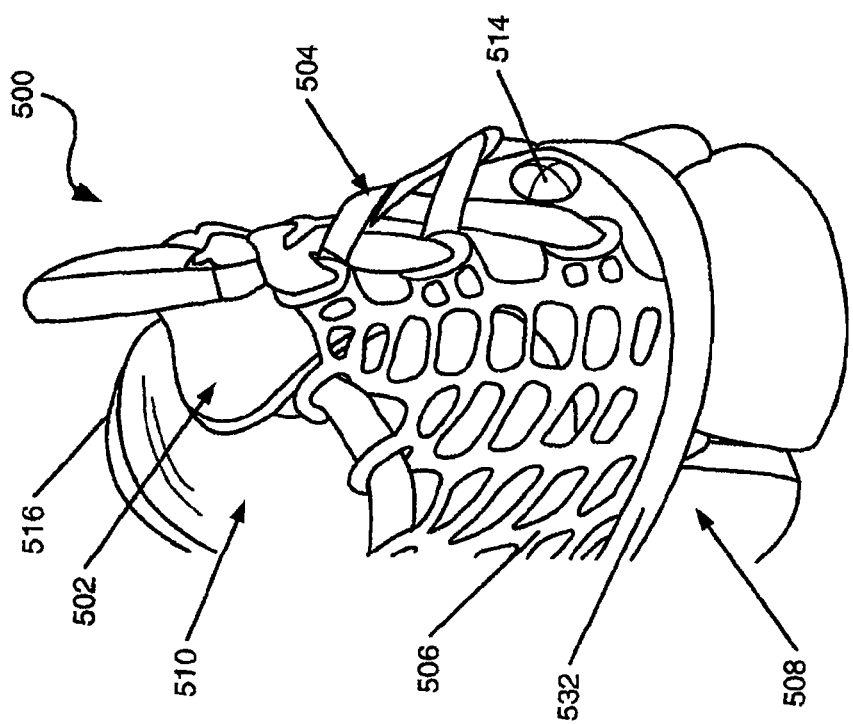
Figure 17C:
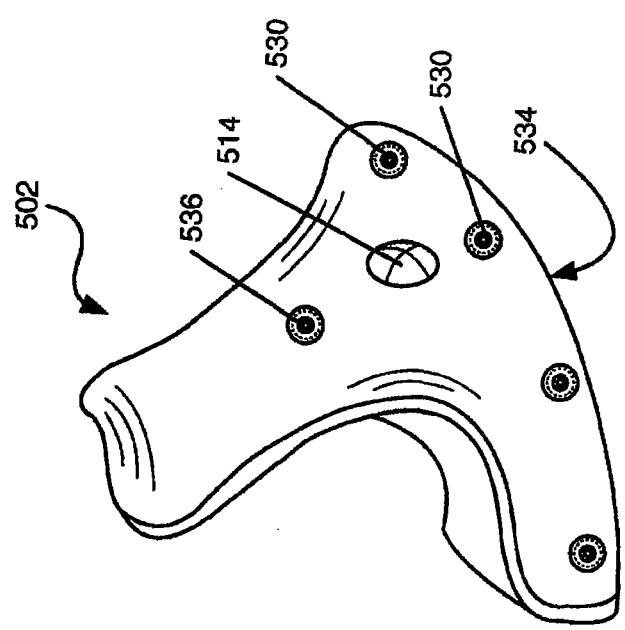

FIGS. 17A-17C illustrate additional features that may be included in footwear structures and arrangements according to at least some examples of this invention. For comfort and/or other potential purposes, a "heel tongue" element 502 may be provided in an article of footwear 500 at the heel securing system or arrangement 504 (if any). This heel tongue element 502 may help modulate user feel of the rear securing systems and arrangements 504, if any; it may help modulate the feel of and/or prevent irritation of a wearer's foot due to slipping or movement of the matrix layer 506 during athletic and/or ambulatory activities; etc. The heel tongue element 502 also may help support the wearer's heel.

The heel tongue element 502 may be made from any desired materials without departing from this invention. As some more specific examples, if desired, the interior surface (e.g., that facing the footwear interior chamber and/or contacting the wearer's foot) may be made from cloth or textile materials, polymeric materials (such as polyurethane or other foam materials), and the like. Additionally or alternatively, if desired, at least some portions of the heel tongue element 502 may be made from a relatively stiff material (e.g., a polymeric material, such as PEBAX® (a polyetherblock co-polyamide polymer available from Atofina Corporation of Puteaux, France)), e.g., to provide additional support in the heel area and/or to provide shape to the matrix layer 506 and/or the overall footwear structure 500 (e.g., akin to a heel counter element, etc.). Optionally, in such circumstances, the relatively stiff, support material may be covered by a cloth, textile, foam, or other feel-modulating material to provide an overall heel tongue element 502 that is comfortable for the wearer and still provides the desired heel and/or footwear structural support. As yet another option, if desired, separate heel counter and heel tongue elements may be provided without departing from this invention.

The heel tongue element 502 may be engaged with the remainder of the footwear structure 500 in any desired manner without departing from this invention. For example, the heel tongue element 502 may be engaged with the upper member 506 and/or the sole structure 508 (e.g., at least some portion of a midsole and/or an outsole structure), for example, by stitching or sewing; by adhesives or cements; by mechanical connectors or fasteners, such as snaps, retaining element structures (e.g., interacting grooves, ledges, openings, retaining members, etc.), hook-and-loop type fasteners, magnetic fasteners, etc.; by lasting a portion of it between the upper member and the sole structure or between portions of the sole structure; etc. The heel tongue element 502 (or at least some portion(s) thereof) may be permanently mounted in an overall footwear structure 500, or it may be removably or releasably mounted (e.g., to enable cleaning, washing, replacement, etc.). In one more specific example, as illustrated in FIG. 17C, an exterior side edge of the heel tongue element 502 may include one or more male snap fastener elements 530 that engage with one or more corresponding female snap fastener elements, e.g., provided in the interior of the upper member structure 506, for example, along the matrix layer 506 (e.g., along batting material 28 shown in FIGS. 7B through 7D) or along the interior of midsole portion 532. As another example, a bottom surface 534 of the heel tongue element 502 (a surface that contacts the generally horizontal surface of the footwear footbed) may include one or more male snap fastener elements that engage with female snap fastener element(s) provided on the footbed. Of course, hook-and-loop fasteners, magnetic fasteners, or other fastener or connector arrangements may be used in place of snap fasteners, if desired, without departing from this invention.

The heel tongue element 502 may provide other features without departing from this invention. For example, the heel tongue element 502 may function as a mounting base or securing structure for other elements. FIGS. 17A and 17B illustrate an article of footwear 500 that includes an interior bootie element 510 (e.g., to provide a comfortable foot-receiving chamber, etc.). To help hold the bootie element 510 in place in the overall article of footwear 500, the bootie element 510 may be secured to the heel tongue element 502. Any desired manner of securing these elements 502 and 510 together may be provided without departing from this invention, including, for example, stitching or sewing; adhesives or cements; mechanical connectors or fasteners, such as snaps, retaining element structures (e.g., interacting grooves, ledges, openings, retaining members, etc.), hook-and-loop type fasteners, magnetic fasteners, etc.; etc. Additionally or alternatively, the bootie element 510 may be secured to other portions of the overall footwear structure 500, if desired, such as to the upper member 506 or the sole structure 508 (e.g., by stitching or sewing; by adhesives or cements; by mechanical connectors or fasteners, such as snaps, retaining element structures (e.g., interacting grooves, ledges, openings, retaining members, etc.), hook-and-loop type fasteners, magnetic fasteners, etc.; etc.).

The bootie element 510 (or at least some portion(s) thereof) may be permanently mounted in the overall footwear structure 500 (including permanently mounted to or formed with the heel tongue element 502), or it may be removably or releasably mounted therewith (e.g., to enable cleaning, washing, replacement, etc.). In one more specific example, a rear heel portion of the bootie element 510 will include one or more male snap members 512 that engage with corresponding female snap element(s) 514 provided on the heel tongue element 502. Of course, hook-and-loop fasteners, magnetic fasteners, or other fastener or connector arrangements may be used in place of snap fasteners, if desired, without departing from this invention. Also, if desired, the bootie element 510 may be structured such that a separate heel tongue element 502 is not needed in the footwear structure 500 (and, optionally, the bootie element 510 may engage the upper member 506 or the sole structure).

The bootie element 510 may be made from any desired material or combination of materials without departing from this invention. In some example footwear structures 500, the bootie element 510 will be formed from conventional fabric and/or foam materials 516 known and used in the art (such as knit fabrics, cotton fabrics, synthetic fabrics, polyurethane foams, etc.). In accordance with at least some examples, the bootie element 510 may have an intermediate layer of soft flexible fabric or foam material with one or more outer layers of batting or other at least somewhat water impermeable material. In at least some examples, the bootie material will be breathable, to allow moisture, air, and/or heat to escape from the bootie interior.

As yet another example, if desired, the heel tongue element 502 may connect to at least some part of the heel securing system (e.g., to the securing element 227" and/or 327" described above in conjunction with FIGS. 14A through 16B), e.g., to help hold these members together, to help prevent loss of the securing element 227" or 327", etc. While any desired manner of connecting the heel tongue element 502 and the securing element 227" or 327" may be used without departing from this invention, in one more specific example, the heel tongue element 502 may include one or more male snap members 536 that engage with corresponding female snap element(s) provided on the securing element 227" or 327" (see element 227a in FIGS. 14A through 14D). Of course, hook-and-loop fasteners, magnetic fasteners, or other fastener or connector arrangements may be used in place of snap fasteners, if desired, without departing from this invention.

As another example, if desired, at least some portion(s) of the bottom surface of the bootie element 510 and/or at least some portion(s) of the footbed of the article of footwear 500 (e.g., an insole or midsole structure) may include surfaces that inhibit or do not allow skidding between the bootie element 510 and the interior footbed of the article of footwear 500. As yet another alternative, if desired, fasteners, non-skid surfaces, and/or other securing elements may be provided in the interior chamber of the article of footwear (e.g., as part of the footbed, the sole structure, the upper member, etc.) that will help prevent movement of the interior bootie element 510 with respect to the interior of the footwear structure 500.

Figure 18:
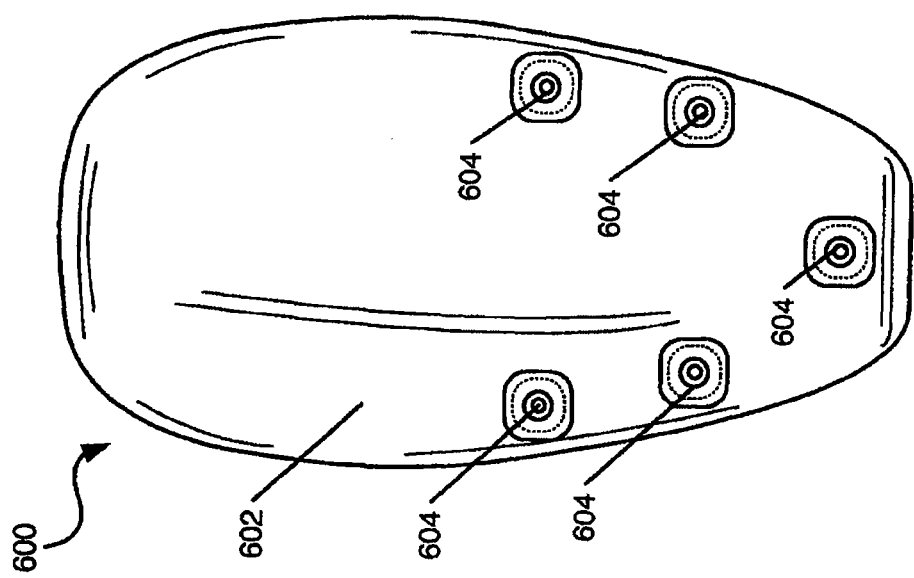
FIG. 18 illustrates a removable instep tongue element that may be included in at least some example footwear structures according to this invention.
Figure 19:
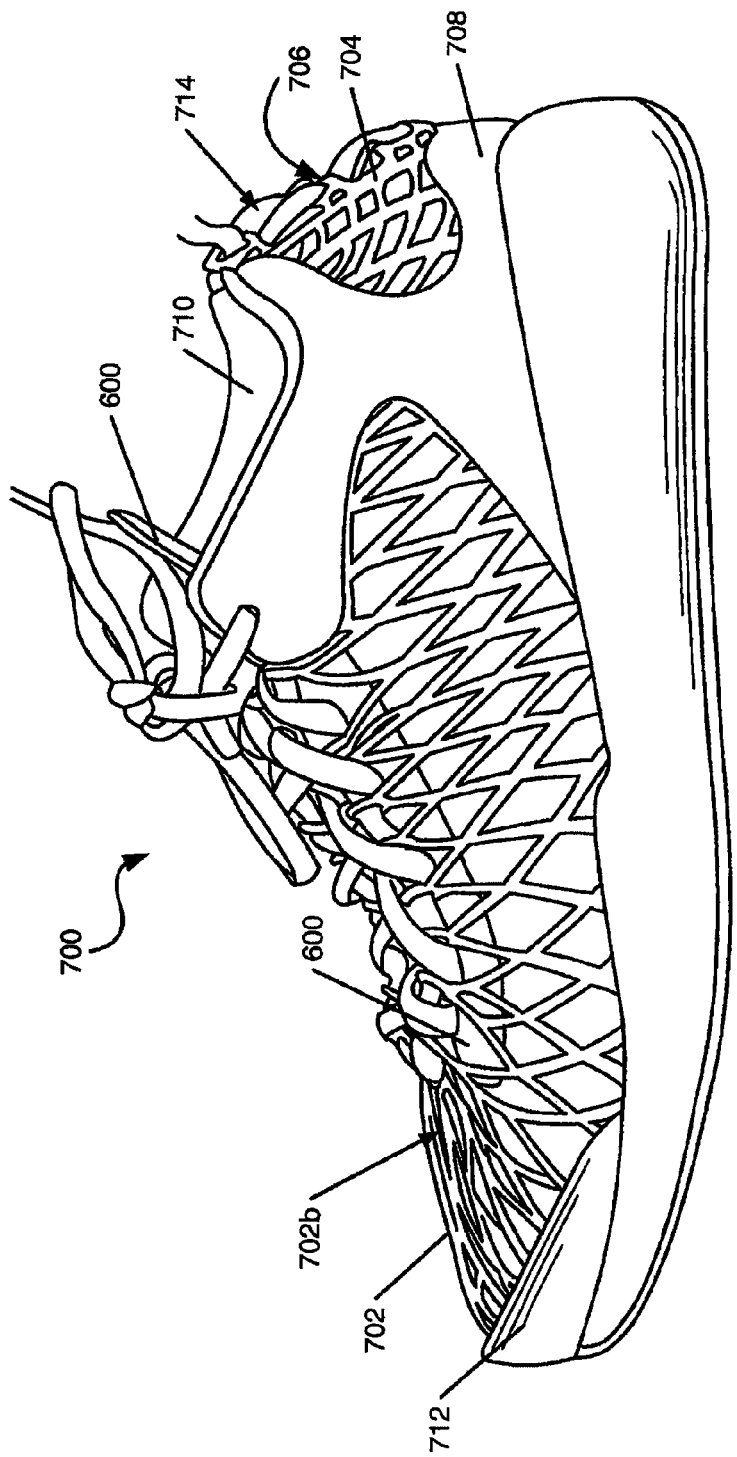
FIG. 19 illustrates an additional example footwear structure according to this invention.

Another comfort-enhancing element or feature that may be included in at least some footwear structures according to examples of this invention is a tongue element 600, an example of which is illustrated in FIG. 18. The tongue element 600 may be provided in the vamp or instep area of an article of footwear, in the throat area between the laces (or other footwear securing elements) and the wearer's foot (FIGS. 19 through 20B illustrate a tongue element 600 and its potential location in an overall article of footwear). The tongue element 600 may help modulate user feel of the laces or other footwear securing elements and thereby enhance the overall comfort of an article of footwear. The tongue element 600 may be formed from any desired material or combination of materials, including materials that are known and used in the art for conventional tongue elements, such as conventional fabric and/or foam materials known and used in the art (such as knit fabrics, cotton fabrics, synthetic fabrics, polyurethane foams, leathers, etc.). In accordance with at least some examples, the tongue element 600 may have a multi-layer construction including an intermediate layer of soft flexible fabric or foam material with one or more outer layers of batting or other at least somewhat impermeable material. In at least some examples, the tongue element 600 material will be breathable, to allow moisture, air, and/or heat to escape and move away from the top of the wearer's foot.

The tongue element 600 may be engaged with the remainder of a footwear structure in any desired manner (permanently mounted or removably mounted), including manners conventionally known or used in the art, such as by stitching or sewing; by adhesives or cements; by mechanical connectors or fasteners, such as snaps, retaining element structures (e.g., interacting grooves, ledges, openings, retaining members, etc.), hook-and-loop type fasteners, magnetic fasteners, etc.; etc. If desired, a batting material (like material 28 of FIGS. 7B through 7D) may be provided in appropriate areas along the instep or vamp area of the upper member structure, e.g., to provide a base element to which the tongue element 600 may be attached (e.g., by stitching or sewing; by adhesives or cements; by mechanical connectors or fasteners, such as snaps, retaining element structures (e.g., interacting grooves, ledges, openings, retaining members, etc.), hook-and-loop type fasteners, magnetic fasteners, etc.; etc.). As one even more specific example, as illustrated in FIG. 18, a top surface 602 of the tongue element 600 may include one or more male snap elements 604 that engage corresponding female snap elements provided with the upper member (e.g., provided on or engaged with the matrix layer, provided as part of a batting layer, etc.).

By removably mounting various elements in an overall footwear structure, a very versatile footwear system may be provided. As described above, in accordance with at least some examples of this invention, a footwear structure may include an upper member comprised primarily of a matrix layer (e.g., layers 40, 140, 240, etc.). Optionally, one or more of a heel tongue element (e.g., element 502), an instep tongue element (e.g., element 600), and/or a bootie element (e.g., element 510) may be removably engaged with and provided as part of the footwear structure. These arrangements give users much flexibility in determining a specific configuration for any desired use. For example, by using a heel tongue element 502 and an instep tongue element 600, a very comfortable and very lightweight footwear product can be provided that a wearer can comfortably wear barefoot, if desired (i.e., without socks), even when performing various athletic or other ambulatory activities. The lightweight bootie element 510 may be added, e.g., for colder conditions, to change the aesthetic appearance, etc.), while still providing a very light and comfortable overall footwear structure. Also, these removable parts are interchangeable for other similar parts, e.g., to allow cleaning, to change aesthetic appearance, to replace worn parts, to change support or other functions, etc. As yet another example, if desired, all of these removable parts may be removed, and the footwear structure may be very suitable for use in wet conditions, e.g., as shower shoes; as beach shoes; as boating, canoeing, kayaking, or rowing shoes (or for other water sports); etc.

The specific examples described above and illustrated in FIGS. 1 through 17A included a matrix layer as a single part or piece that provides all or substantially all of the upper member structure (e.g., forming at least 80% or 90% of the overall upper member structure, and in the illustrated examples, at least 95% or even 98% of the overall upper member structure). This is not a requirement in all example footwear structures according to this invention. For example, as illustrated in FIG. 19, the upper member may be made from multiple pieces without departing from this invention. In this illustrated footwear structure 700, the upper member includes a first matrix layer portion 702 that covers a major portion of the footwear lateral and medial sides (lateral side 702*a*), as well as the vamp or instep area 702*b*. A separate rear lateral heel matrix material 704 is provided on one side of the footwear structure 700, and another, separate rear medial heel matrix material 706 is provided on the other side of the footwear structure. The various matrix materials 702, 704, and 706 are connected to intermediate footwear upper member structures 708 and 710, which may be formed of any desired materials, such as conventional footwear upper member materials, such as leather, polymers, fabrics, canvas, etc. Advantageously, in at least some example structures, the intermediate footwear upper member structures 708 and/or 710 may extend around the ankle opening area and provide comfort-enhancing materials (e.g., fabric(s), foam(s), etc.) around the ankle opening and at least some areas that will directly contact the wearer's foot. The matrix materials 702, 704, and 706 may be connected to the intermediate footwear upper member structures 708 and 710 in any desired manner, such as sewing or stitching; adhesives or cements; or mechanical connectors; etc.

Of course, the various matrix layers and/or intermediate footwear upper member structures may make up any desired relative portions of the overall footwear upper structure without departing from this invention. Also, the matrix layers and/or intermediate footwear upper member structures may be located at any desired positions along the overall upper member structure without departing from this invention. Also, any number of independent matrix layers parts and/or intermediate footwear upper member structures may be provided in a given footwear structure without departing from this invention. As more specific examples, if desired, in the structure 700 illustrated in FIG. 19, the intermediate footwear upper member structures 708 and 710 may be combined to form a single overall piece, e.g., that extends completely around the ankle opening, and/or optionally provides eyelets or other lace engaging elements (or other footwear securing structures) down at least a portion of the throat or instep area of the footwear structure. As another example, if desired, the two rear heel matrix layers 704 and 706 may be formed from one part that spans both the lateral and medial sides (and optionally, the size adjusting mechanism 714 in the heel area may be omitted). As yet another example, if desired, the large side and instep matrix layer 702 and/or the heel matrix layers 704 and/or 706 may be formed from multiple independent parts. As still another example, if desired, an intermediate footwear upper member material may be provided as a toe cap (or optionally, sole area 712 or other sole material may extend over to cover the front of the toe and provide a toe cap). Any desired combination of these features and/or other structural options may be provided in an overall footwear structure without departing from examples of the invention.

Figure 20A:
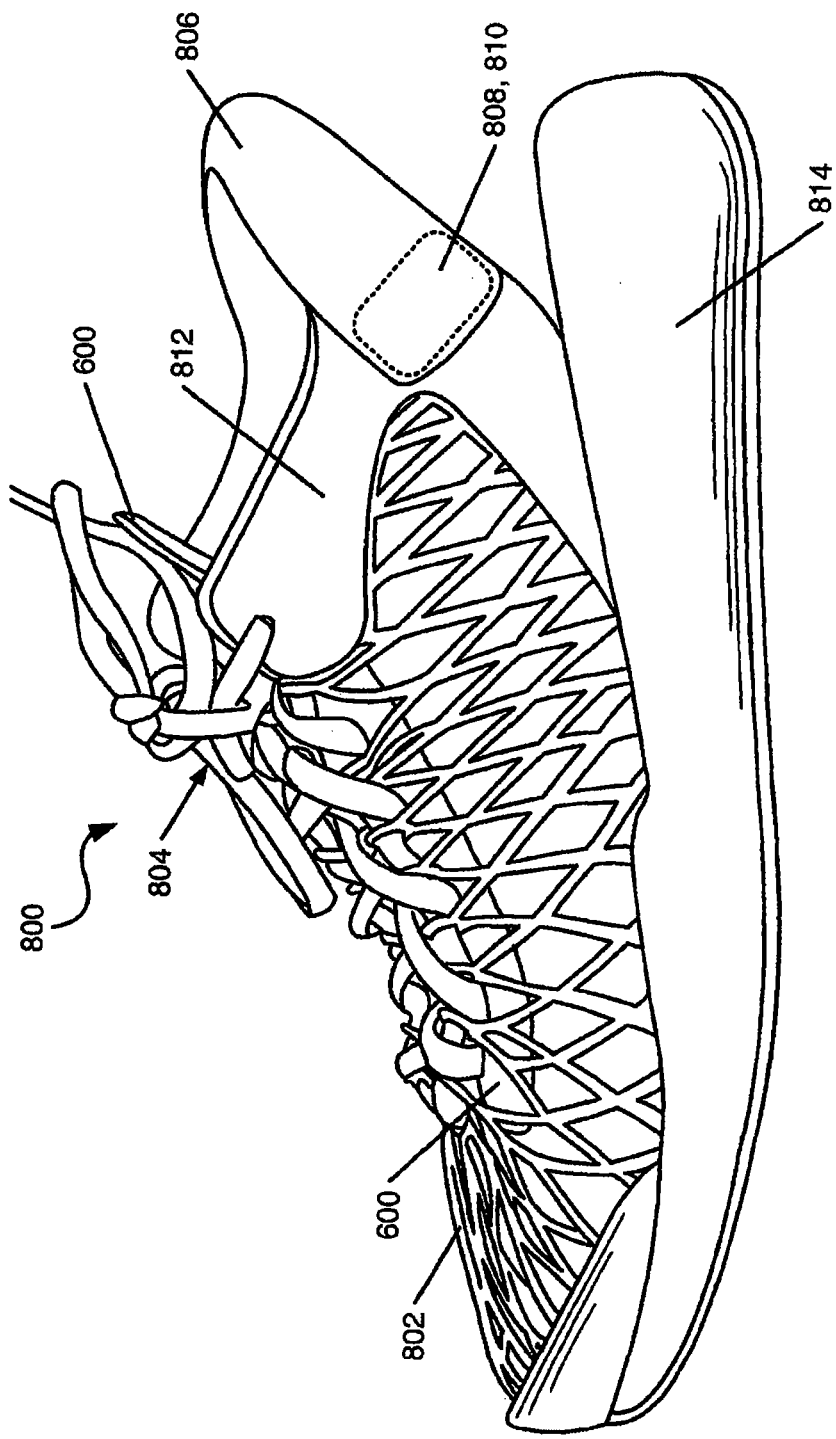
FIGS. 20A and 20B illustrate an additional example footwear structure according to this invention.
Figure 20B:
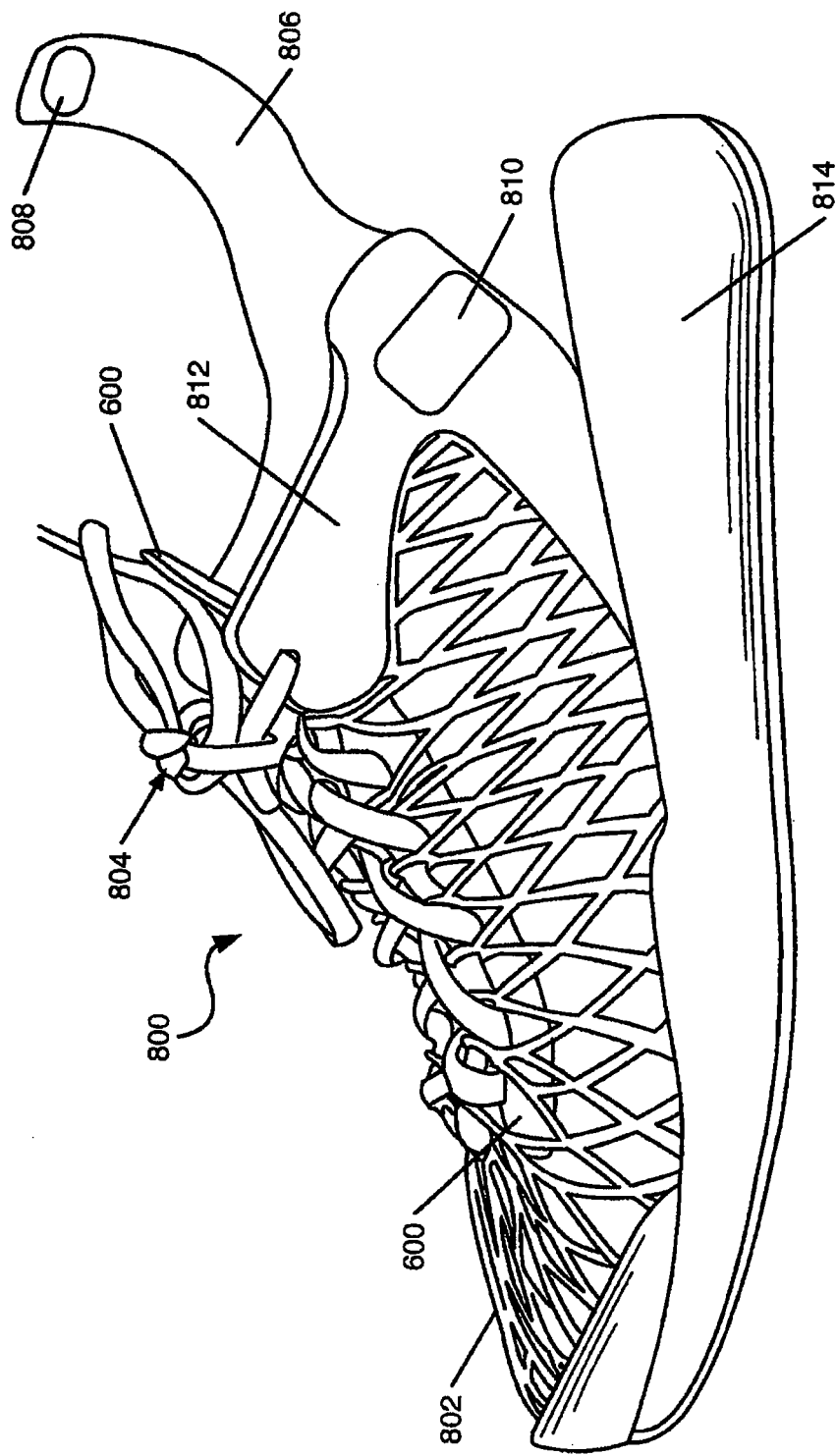

FIGS. 20A and 20B illustrate yet another example footwear structure 800 in accordance with this invention. This example structure 800, while similar in general appearance to the structure 700 shown in FIG. 19, does not include any rear matrix layer (or other footwear elements), thereby appearing and functioning more like a sandal. As shown, the matrix layer 802 (shown as one piece, but optionally may be constructed from more than one piece) extends along the medial and lateral sides of the upper member structure and over the vamp or instep area. As noted above, the rear portion of this example footwear structure is open to allow insertion of the wearer's foot from the top/rear (if desired, in such structures, the lace portions 804 may be eliminated, but if necessary or desired, laces or other size adjusting mechanisms may be provided without departing from this invention.

In this illustrated example structure 800, a strap member 806 is provided to help secure the article of footwear 800 on a wearer's foot. This illustrated strap member 806 includes a fastener element 808 that engages with a corresponding and/or complementary fastener element 810 provided on another part of the footwear structure 800 (e.g., on the matrix layer 802, on an intermediate footwear upper member structure 812, on another portion of the upper member structure, on the sole member 814, etc.). Any desired fastening system and/or number of fasteners or straps may be provided without departing from this invention, including, for example, snap fasteners, hook-and-loop type fasteners, buckle type fasteners, retaining member/groove type fasteners, adhesive type fasteners, hook type fasteners, lace type fasteners, etc. As yet another example, if desired, the fastener(s) 808 and 810 may be eliminated and the strap 806 may permanently extend around the rear portion of the article of footwear, e.g., if at least some portion of the strap 808, matrix layer 802, and/or the intermediate footwear upper member structure 812 is at least somewhat elastic or stretchable, e.g., to allow the wearer's foot to be inserted and/or removed. Of course, other structural arrangements for the securing mechanism(s), the upper member structure 802, and/or other portions of the overall footwear structure are possible without departing from this invention. Such structures may be particularly useful as shower shoes, as beachwear, for water sports, as boat shoes (or for use in canoeing, kayaking, rowing, and/or other wet conditions), and the like.

Figure 21:
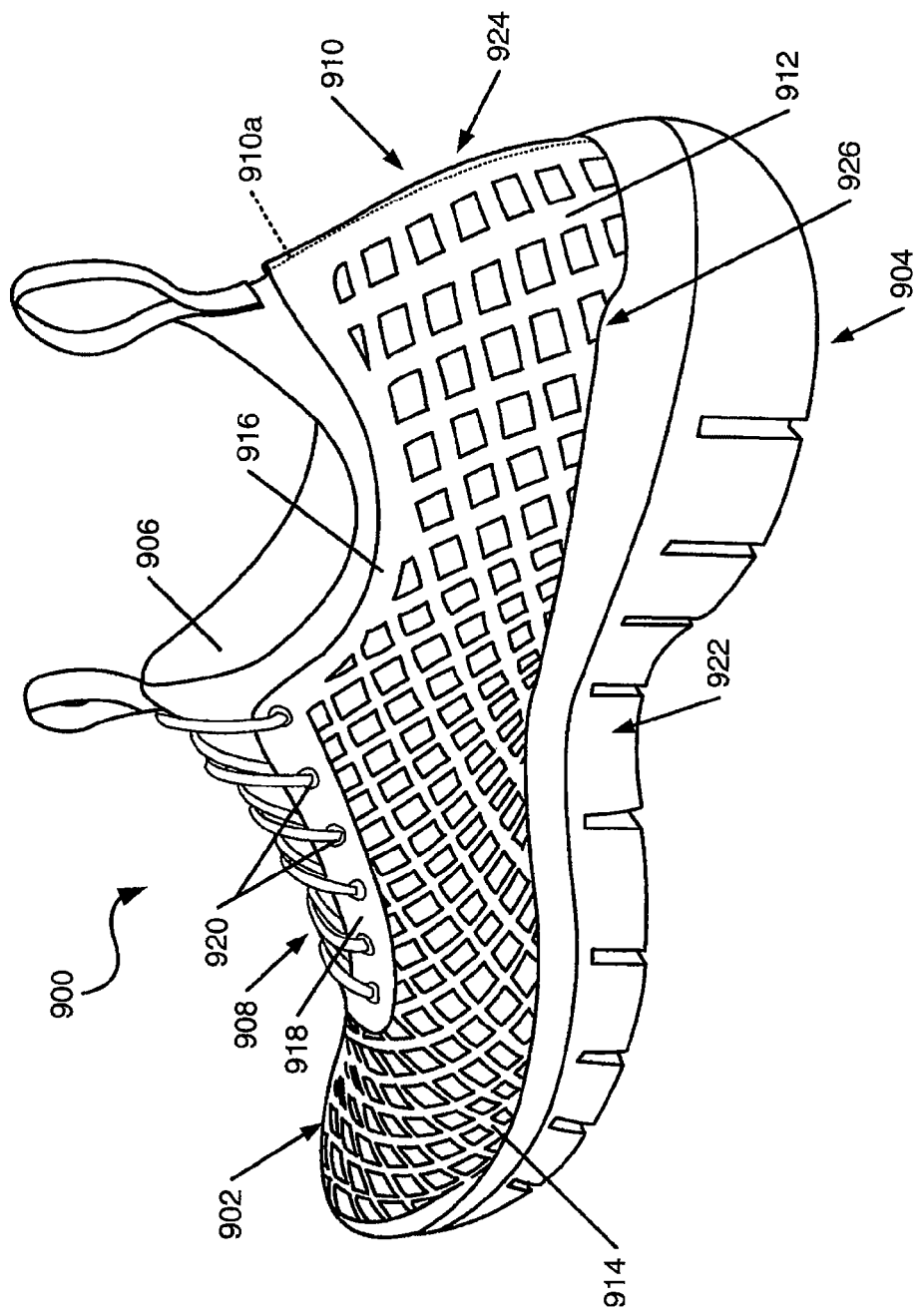
FIG. 21 illustrates yet another example footwear structure according to this invention.

An additional example footwear structure 900 according to this invention is illustrated in FIG. 21. This example structure 900 includes a polymer matrix upper member 902 and a sole structure 904, which may have any of the structures, variations, and/or features described above. Also, while an interior bootie element 906 (optionally removable) and a lace securing mechanism 908 is shown in FIG. 21, other features may be provided without departing from this invention, such as a heel tongue member, an instep tongue member, an insole or sock liner member, none of these additional elements, a different securing system structure, etc.

The structure 900 of FIG. 21 differs from those illustrated in FIGS. 1-20A in various ways. For example, in the structure 900 of FIG. 21, the rear heel region 910 is permanently formed as a unitary construction (in other words, it is not directly size adjustable at the rear heel). This can be accomplished in any desired manner without departing from this invention. For example, if desired, the upper member 902 can be directly formed (e.g., molded) in this manner in the heel region. As another example, the upper member 902 may be formed as a flat, one piece construction (e.g., as described above), and the free ends of the matrix structure that form the rear heel region (e.g., free ends 44c and 44d described above) may be fixedly joined together in some manner, e.g., at a lap (or overlapping) joint seam (910a). Any desired manner of fixing these ends together may be used without departing from this invention, such as adhesive or cement bonding (optionally with application of heat and/or pressure), laser welding, melt adhesion (by application of heat and pressure), other fusing techniques, etc.

Another feature illustrated in the example structure 900 of FIG. 21 shows the matrix layer 902 in the heel region having thicker segments 912 as compared to the segments 914 in the midfoot and/or front foot regions. This feature may help provide additional support at the heel and additional flexibility in the forefoot region.

Also, in the example structure 900 shown in FIG. 21, the matrix layer upper member 902 includes a widened portion along its exterior edges (as compared to the loops and/or segmented structures shown, for example, in FIGS. 1-12). More specifically, as shown, a solid portion of the upper member structure 902 is provided (and in this illustrated example, continuously extends) along the seam 910a, along the ankle opening 916, and down the throat opening 918 (similar structures are provided on the non-illustrated opposite side of this footwear structure 900). These solid portions provide a base for forming or attaching various other elements, such as conventional footwear eyelets 920 or other footwear securing system elements, such as buckles, straps, zippers, other fasteners, etc. They also may provide a base for attaching comfort-enhancing elements, such as a heel tongue, an instep tongue, a soft element around the ankle opening, etc.

This widened upper member edge portion (or discrete portions thereof) may be provided in or with the upper member structure 902 in any desired manner without departing from this invention. For example, it may be molded into the overall upper member structure as an integral and one-piece construction, e.g., during the molding operations described above in conjunction with FIGS. 7A through 7D. As another example, the widened portion (or at least some portions thereof) may be provided as one or more separate elements to which the matrix layer of the upper member 902 is attached (by stitching, adhesives, etc.). Other constructions and arrangements for providing this widened portion are possible without departing from this invention.

The structure 900 of FIG. 21 provides a versatile base for inclusion of many of the various features described above in conjunction with FIGS. 1-20A. Notably, the specific example structure 900 illustrated in FIG. 21 has a very sculpted appearance, e.g., at the medial sole area 922, and a contoured rear heel appearance 924. The medial side heel area designated by reference number 926 in this illustrated example also has a relatively high top line (higher than some of the example structures illustrated in other figures).

Of course, a wide variety of specific footwear structures may take advantage of one or more of the above-described various features of FIG. 21 without departing from this invention.

III. Conclusion

The invention is disclosed above and in the accompanying drawings with reference to a variety of embodiments. The purpose served by the disclosure, however, is to provide an example of the various features and concepts related to aspects of the invention, not to limit the scope of aspects of the invention. One skilled in the relevant art will recognize that numerous variations and modifications may be made to the embodiments described above without departing from the scope of the invention, as defined by the appended claims.

That which is claimed is:

1. A method of manufacturing an article of footwear, comprising:
    forming a unitary, one piece polymer matrix structure that defines a plurality of apertures separated by polymer segments, the polymer matrix structure formed from a flat member that is symmetrical about an axis extending in a front-to-rear direction, wherein the polymer matrix structure includes a first free end and a second free end;
    incorporating the polymer matrix structure into an upper such that the first free end extends along a heel region of the upper and the second free end extends along the heel region of the upper;
    engaging the first free end and the second free end; and
    securing a sole member to the upper.

2. The method recited in claim 1, wherein the first free end includes a plurality of openings and the second free end includes a plurality of openings, and wherein the engaging includes passing a cord between the openings of the first and second free ends.

3. The method recited in claim 1, wherein the first free end includes a first engagement structure and the second free end includes a second engagement structure, and wherein the engaging includes connecting an intermediate member between the first engagement structure and the second engagement structure.

4. The method recited in claim 1, wherein the first free end includes a first engagement structure and the second free end includes a second engagement structure, and wherein the engaging includes engaging the first engagement structure to the second engagement structure.

5. The method recited in claim 1, wherein the polymer matrix structure extends as a unitary structure to form at least a major portion of a forefoot portion, a midfoot portion, and the heel region of the article of footwear.

6. The method recited in claim 1, further comprising:
engaging a heel tongue element with at least one of the upper or the sole structure, wherein the heel tongue element is engaged at the heel region adjacent the first free end and the second free end.

7. The method recited in claim 6, further comprising:
releasably engaging a bootie member with the heel tongue element.

8. The method recited in claim 1, further comprising:
inserting a bootie member into a foot-receiving chamber at least partially defined by the upper.

9. The method recited in claim 1, wherein the first free end and the second free end are fixed together at a lap joint seam.

10. A method of manufacturing an article of footwear, comprising:
forming a unitary, one piece polymer matrix structure that defines a plurality of apertures separated by polymer segments, the polymer matrix structure formed from a flat member that is symmetrical about an axis extending in a front-to-rear direction, wherein the polymer matrix structure extends as a unitary structure to form a major portion of at least a forefoot portion, a midfoot portion, and a heel portion of the article of footwear;
incorporating the polymer matrix structure into an upper;
securing a sole member to the upper; and
engaging a heel tongue element with at least one of the upper or the sole member.

11. The method recited in claim 10, further comprising:
releasably engaging a bootie member with the heel tongue element.

12. The method recited in claim 10, further comprising:
releasably engaging a bootie member within a foot-receiving chamber at least partially defined by the upper.

13. The method recited in claim 10, further comprising:
providing a footwear securing mechanism over a throat area defined in the upper member.

14. The method recited in claim 13, further comprising:
engaging a tongue member adjacent the footwear securing mechanism and adjacent a foot-receiving chamber at least partially defined by the upper.

15. The method recited in claim 14, wherein the tongue member is releasably engaged with the upper.

16. The method recited in claim 10, wherein the heel tongue element is releasably engaged with at least one of the upper or the sole member.

17. The method recited in claim 16, wherein the heel tongue element is releasably engaged with at least one of the upper or the sole member, and whether the method further comprises:
releasably engaging a bootie member with the heel tongue element.

18. The method recited in claim 17, further comprising:
providing a footwear securing mechanism over a throat area defined in the upper member; and
engaging a tongue member adjacent the footwear securing mechanism and adjacent a foot-receiving chamber at least partially defined by the upper.

19. The method recited in claim 18, wherein the tongue member is releasably engaged with the upper.

20. The method recited in claim 10, further comprising:
providing a size adjusting mechanism for the upper in the heel portion adjacent the heel tongue element.

* * * * *